US012526792B2

(12) United States Patent
Lin

(10) Patent No.: US 12,526,792 B2
(45) Date of Patent: Jan. 13, 2026

(54) METHOD AND USER EQUIPMENT FOR LOGICAL-CHANNEL-BASED PRIORITIZATION FOR URLLC IN UNLICENSED SPECTRUM

(71) Applicant: Purplevine Innovation Company Limited, Hong Kong (CN)

(72) Inventor: Yi-Ting Lin, Hong Kong (CN)

(73) Assignee: Purplevine Innovation Company Limited, Hong Kong (CN)

( * ) Notice: Subject to any disclaimer, the term of this patent is extended or adjusted under 35 U.S.C. 154(b) by 351 days.

(21) Appl. No.: 17/909,993

(22) PCT Filed: Jan. 12, 2022

(86) PCT No.: PCT/CN2022/071626
§ 371 (c)(1),
(2) Date: Sep. 8, 2022

(87) PCT Pub. No.: WO2022/152169
PCT Pub. Date: Jul. 21, 2022

(65) Prior Publication Data
US 2023/0108898 A1  Apr. 6, 2023

Related U.S. Application Data

(60) Provisional application No. 63/270,104, filed on Oct. 21, 2021, provisional application No. 63/136,222, filed on Jan. 12, 2021.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/512* (2023.01); *H04W 72/56* (2023.01); *H04W 80/02* (2013.01)

(58) Field of Classification Search
CPC ........... H04L 1/1812; H04W 72/1268; H04W 72/512; H04W 72/56; H04W 80/02
See application file for complete search history.

(56) References Cited

U.S. PATENT DOCUMENTS

2022/0116987 A1* 4/2022 Chin ................. H04W 72/1268
2022/0158769 A1  5/2022 Gou et al.
(Continued)

FOREIGN PATENT DOCUMENTS

CN         110535555        12/2019
WO     WO 2020/168223      8/2020
WO     WO 2020/144403      7/2022

OTHER PUBLICATIONS

3GPP TS 38.321 version 15.5.0 Release 15, titled 5G; NR; Medium Access Control (MAC) protocol specification. (Year: 2019).*
(Continued)

*Primary Examiner* — Ayaz R Sheikh
*Assistant Examiner* — Christopher R Davis

(57) ABSTRACT

A user equipment (UE) executes a wireless communication method to harmonize features for NR-based access to unlicensed spectrum (NR-U) and Ultra-reliable low-latency communications (URLLC). The UE comprises a medium access control (MAC) entity. The MAC entity prioritizes autonomous transmission of a pending MAC protocol data unit (PDU) through a first UL grant over transmission of the MAC PDU indicated as new data through a second UL grant when a logical channel (LCH) priority associated with the MAC PDU indicated as new data is not higher than an LCH priority associated with the pending MAC PDU. The MAC entity prioritizes transmission of the MAC PDU indicated as new data through the second UL grant over autonomous transmission of the pending MAC PDU when the LCH priority associated with the MAC PDU indicated as new
(Continued)

data is higher than the LCH priority associated with the pending MAC PDU.

34 Claims, 14 Drawing Sheets

(51) Int. Cl.
*H04W 72/512* (2023.01)
*H04W 72/56* (2023.01)
*H04W 80/02* (2009.01)

(56) References Cited

U.S. PATENT DOCUMENTS

2022/0217760 A1   7/2022  Iyer et al.
2023/0058734 A1*  2/2023  Xiao .................... H04L 1/1812

OTHER PUBLICATIONS

3GPP TS 38.331 version 16.1.0, Release 16, titled NR; Radio Resource Control (RRC); Protocol specification (Year: 2020).*
International Search Report and the Written Opinion Dated Apr. 13, 2022 From the International Searching Authority Re. Application No. PCT/CN2022/071626. (7 Pages).
Nokia et al., "Uplink CG Harmonization for NR-U and URLLC", Nokia Shanghai Bell, 3GPP TSG-RAN WG2 Meeting #112 Electronic, R2-2009758, Elbonia, Nov. 2-13, 2020, Sections 1-2, Nov. 13, 2020. (5 Pages).
China Telecom, "Some Considerations on Intra-UE Data-Data Prioritization", China Telecom, 3GPP TSG-RAN WG2 Meeting #107bis, R2-1913662, Chongqing, China, Oct. 14-18, 2019, Sections 1-2, Oct. 18, 2019. (3 Pages).

* cited by examiner

METHOD AND USER EQUIPMENT FOR LOGICAL-CHANNEL-BASED PRIORITIZATION FOR URLLC IN UNLICENSED SPECTRUM

RELATED APPLICATIONS

This application is a National Phase of PCT Patent Application No. PCT/CN2022/071626 having International filing date of Jan. 12, 2022, which claims the benefit of priority under 35 USC § 119(e) of U.S. Provisional Patent Application Nos. 63/270,104 filed on Oct. 21, 2021 and 63/136,222 filed on Jan. 12, 2021. The contents of the above applications are all incorporated by reference as if fully set forth herein in their entirety.

FIELD AND BACKGROUND OF THE INVENTION

The present disclosure relates to the field of cellular communication, and more particularly, to a wireless communication method and a user equipment.

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards being a broadband and mobile system. In cellular wireless communication systems, user equipment (UE) is connected by a wireless link to a radio access network (RAN). The RAN comprises a set of base stations (BSs) that provide wireless links to the UEs located in cells covered by the base station, and an interface to a core network (CN) which provides overall network control. As will be appreciated the RAN and CN each conduct respective functions in relation to the overall network. The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

Awork item (WI) on enhanced Industrial Internet of Things (IIoT) and ultra-reliable and low latency communication (URLLC) support for New Radio (NR) has been approved. One objective of the work item description (WID) for release seventeen (Rel-17) IIoT/URLLC work item is to examine how the enhancement of configured grants (CGs) introduced in Rel-16 for both licensed and unlicensed bands can be harmonized. It has been agreed that using existing mechanisms to achieve such harmonization should be considered as baseline.

Hence, a solution is desired to harmonize uplink (UL) configured-grant enhancements in NR in unlicensed spectrum (NR-U) and URLLC introduced in Rel-16 and make the harmonized feature applicable for unlicensed spectrum.

SUMMARY OF THE INVENTION

An object of the present disclosure is to propose a wireless communication method and a user equipment.

In a first aspect, an embodiment of the invention provides a wireless communication method executable in a user equipment (UE), comprising:
a medium access control (MAC) entity determining whether a medium access control (MAC) protocol data unit (PDU) is buffered in a hybrid automatic repeat request (HARQ) buffer of a HARQ process as a pending MAC PDU and detecting a collision involving a plurality of uplink (UL) grants, in which a first uplink grant in the plurality of UL grants received by the UE and overlaps with a second UL grant in the plurality of UL grants, wherein the first UL grant is allocated for autonomous transmission of the pending MAC PDU in ultra-reliable and low latency communications (URLLC) over an unlicensed band, and the second UL grant is allocated for transmission of a MAC PDU indicated as new data in URLLC over the unlicensed band; and
the MAC entity prioritizing autonomous transmission of the pending MAC PDU through the first UL grant over transmission of the MAC PDU indicated as new data through the second UL grant when a logical channel (LCH) priority associated with the MAC PDU indicated as new data is not higher than an LCH priority associated with the pending MAC PDU; and
the MAC entity prioritizing transmission of the MAC PDU indicated as new data through the second UL grant over autonomous transmission of the pending MAC PDU through the first UL grant when the LCH priority associated with the MAC PDU indicated as new data is higher than the LCH priority associated with the pending MAC PDU.

In a second aspect, an embodiment of the invention provides a user equipment (UE) comprising a processor configured to call and run a computer program stored in a memory, to cause a device in which the chip is installed to execute the disclosed method and any combination of embodiments of the disclosed method.

In a third aspect, an embodiment of the invention provides a wireless communication method executable in a UE, comprising:
a medium access control (MAC) entity determining whether a medium access control (MAC) protocol data unit (PDU) is buffered in a hybrid automatic repeat request (HARQ) buffer of a HARQ process as a pending MAC PDU and detecting a collision involving the pending MAC PDU and a MAC PDU indicated as new data, wherein the pending MAC PDU is for ultra-reliable and low latency communications (URLLC);
the MAC entity prioritizing autonomous transmission of the pending MAC PDU through a first uplink configured grant on an unlicensed band over the transmission of the MAC PDU indicated as new data when a logical channel (LCH) priority associated with the MAC PDU indicated as new data is not higher than an LCH priority associated with the pending MAC PDU; and
the MAC entity prioritizing transmission of the MAC PDU indicated as new data through the first uplink configured grant on the unlicensed band over autonomous transmission of the pending MAC PDU when the LCH priority associated with the MAC PDU indicated as new data is higher than the LCH priority associated with the pending MAC PDU.

In a fourth aspect, an embodiment of the invention provides a UE comprising a processor configured to call and run a computer program stored in a memory, to cause a device in which the chip is installed to execute the disclosed method and any combination of embodiments of the disclosed method.

The disclosed method may be programmed as computer executable instructions stored in non-transitory computer readable medium. The non-transitory computer readable medium, when loaded to a computer, directs a processor of the computer to execute the disclosed method.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed method may be programmed as a computer program product, that causes a computer to execute the disclosed method.

The disclosed method may be programmed as a computer program, that causes a computer to execute the disclosed method.

Embodiments of the disclosure provide:

By configuring lch-based Prioritization and cg-RetransmissionTimer simultaneously, the URLLC services operated on unlicensed spectrum can be transmitted as early as possible.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field may obtain other figures according to these figures without paying the premise.

DESCRIPTION OF SPECIFIC EMBODIMENTS OF THE INVENTION

Figure 1:
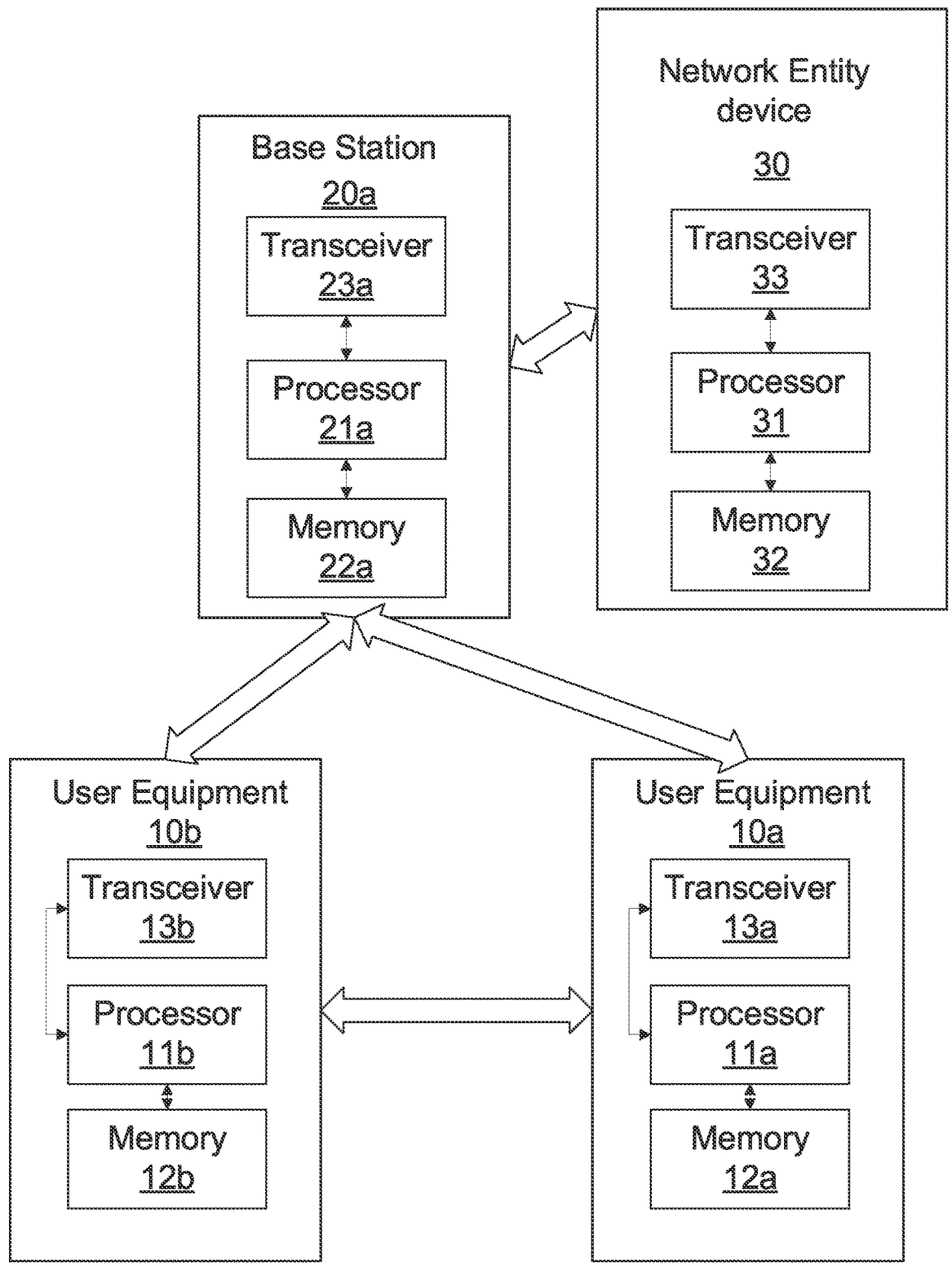
FIG. 1 illustrates a schematic view of a telecommunication system.

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The disclosure provides embodiments of processing the logical channel (LCH) prioritization for the configured grant (CG) operated in unlicensed controlled environment (UCE). LCH prioritization for CG had been discussed in Rel-16 URLLC work item (WI), and it is used to select an appropriate UL grant from the UL grants overlapping in time. However, in Rel-16 URLLC WI, only operation on licensed band was considered. The operation on unlicensed band was discussed in Rel-16 WI NR-based access to unlicensed spectrum (NR-U). For NR-U, there is no discussion about intra-UE prioritization between overlapping UL grants including configured grant and dynamic grant (CG-DG) overlapping as well as configured grant and configured grant (CG-CG) overlapping. In order to harmonize the CG enhancements in LCH prioritization with operation in UCE, the differences between URLLC and NR-U should be discussed first. At least two problems should be addressed:

1. For Rel-17 IIoT/URLLC, is autonomous retransmission/transmission performed on the same or on different CG?
2. For Rel-17 IIoT/URLLC, which one of retransmission of a MAC PDU or transmission of a MAC PDU with the highest LCH priority should be prioritized?

A UE conforming to Rel-16 URLLC and a UE conforming to Rel-16 NR-U follow different rules regarding whether autonomous retransmission/transmission is performed on the same or on different CG configurations, which are detailed in the following.

In NR-U, autonomous retransmissions can be performed on a different CG configuration than the initial transmission. See the quoted section 5.4.2.2 in TS 38.321 v16.0.0.

TABLE 1

NR-U rules

Retransmissions are performed on the resource and, if provided, with the MCS indicated on PDCCH, or on the same resource and with the same MCS as was used for last made transmission attempt within a bundle, or TABLE 1-continued NR-U rules on stored configured uplink grant resources and stored MCS when cg-RetransmissionTimer is configured. Retransmissions with the same HARQ process may be performed on any configured grant configuration if the configured grant configurations have the same TBS.

In URLLC, however, autonomous transmission assumes no HARQ process sharing across CG configurations. Therefore, a deprioritized MAC PDU cannot be performed on different CG(s) based on Rel-16 autonomous transmission. See the agreements in RAN2 #109-e meeting.

TABLE 2

URLLC rules

UE autonomous transmission uses the same HARQ process and the same CG configuration. No change to the current running CR.
A HARQ process cannot be shared between different CGs.

A UE conforming to Rel-16 URLLC and a UE conforming to Rel-16 NR-U follows different rules regarding which one between retransmission of a pending Medium Access Control Protocol Data Unit (MAC PDU) or transmission of a new MAC PDU with the highest LCH priority should be prioritized, which are detailed in the following.

In NR-U, since LCH prioritization is not considered, retransmissions are always prioritized over new transmission. See the quoted section 5.4.1 in TS 38.321 v16.0.0:

TABLE 3

NR-U rules

For configured uplink grants configured with cg-RetransmissionTimer, the UE implementation selects a HARQ Process ID among the HARQ process IDs available for the configured grant configuration. The UE shall prioritize retransmissions before initial transmissions. The UE shall toggle the NDI in the CG-UCI for new transmissions and not toggle the NDI in the CG-UCI in retransmissions.

In URLLC, the MAC PDU is prioritized based on LCH priorities. See the quoted section 5.4.1 in TS 38.321 v16.0.0:

TABLE 4

URLLC rules

For the MAC entity configured with lch-basedPrioritization, priority of an uplink grant is determined by the highest priority among priorities of the logical channels with data available that are multiplexed or can be multiplexed in the MAC PDU, according to the mapping restrictions as described in clause 5.4.3.1.2.

The embodiments of the disclosure involve information element (IE) MAC-CellGroupConfig, IE ConfiguredGrantConfig, and parameters lch-BasedPrioritization-r16, lch-BasedPrioritization-r17, and timer autonomousTX, cg-RetransmissionTimer, and configuredGrantTimer. Based on the operation environment, e.g., unlicensed/licensed band, or collision from unexpected device, the network (e.g., a gNB) configures a UE with either or both of autonomousTX, and cg-RetransmissionTimer to perform logical channel (LCH) prioritization. Note that unless otherwise specified, in this disclosure the parameters lch-basedPrioritization, autonomousTX, and cg-RetransmissionTimer, stands for lch-basedPrioritization-r16, autonomousTX-r16, and cg-RetransmissionTimer-r16, respectively. Note that even though lch-BasedPrioritization-r17 is used as an example of a Rel-17 new parameter in the description, any of other new defined parameters may be utilized in the embodiments of the disclosure to provide similar functions or operations in the embodiments. The lch-BasedPrioritization-r17 may be named alternatively in other terms.

In Embodiment 1, the network (e.g., a gNB) configures a Rel-17 UE with lch-basedPrioritization and autonomousTX to enable the LCH prioritization on licensed spectrum or UCE. Embodiment 1 describes how to transmit the deprioritized UL grant for a UE configured with lch-basedPrioritization and autonomousTX.

In Embodiment 2 and Embodiment 4, the network configures a Rel-17 UE with lch-basedPrioritization-r17 and cg-RetransmissionTimer to enable the LCH prioritization on unlicensed spectrum. Embodiment 2 describes how to transmit the deprioritized UL grant for a UE configured with lch-based Prioritization and cg-RetransmissionTimer.

In Embodiments 3, 3a, 3b, 3c, and 4, the network configures a Rel-17 UE with lch-basedPrioritization-r17, autonomousTX, and cg-RetransmissionTimer to enable the LCH prioritization on licensed spectrum or UCE. Embodiments 3, 3a, 3b, and 4 describe the overall process of a UE operating with overlapping CGs. Embodiment 3c further describes the overall process of a UE operating with only one CG. In embodiments 3, 3a, 3b, and 3c, the UE is simultaneously configured with lch-basedPrioritization-r16/lch-basedPrioritization-r17, autonomousTX, and cg-RetransmissionTimer. In embodiment 4, the UE is configured with lch-based Prioritization-r16/lch-basedPrioritization-r17 and cg-RetransmissionTimer.

With reference to FIG. 1, a telecommunication system including a UE 10a, a UE 10b, a base station (BS) 20a, and a network entity device 30 executes the disclosed method according to an embodiment of the present disclosure. FIG. 1 is shown for illustrative, not limiting, and the system may comprise more UEs, BSs, and CN entities. Connections between devices and device components are shown as lines and arrows in the FIGS. The UE 10a may include a processor 11a, a memory 12a, and a transceiver 13a. The UE 10b may include a processor 11b, a memory 12b, and a transceiver 13b. The base station 20a may include a processor 21a, a memory 22a, and a transceiver 23a. The network entity device 30 may include a processor 31, a memory 32, and a transceiver 33. Each of the processors 11a, 11b, 21a, and 31 may be configured to implement proposed functions, procedures and/or methods described in the description. Layers of radio interface protocol may be implemented in the processors 11a, 11b, 21a, and 31. Each of the memory 12a, 12b, 22a, and 32 operatively stores a variety of programs and information to operate a connected processor. Each of the transceivers 13a, 13b, 23a, and 33 is operatively coupled with a connected processor, transmits and/or receives radio signals or wireline signals. The UE 10a may be in communication with the UE 10b through a sidelink. The base station 20a may be an eNB, a gNB, or one of other types of radio nodes, and may configure radio resources for the UE 10a and UE 10b.

Each of the processors 11a, 11b, 21a, and 31 may include an application-specific integrated circuit (ASICs), other chipsets, logic circuits and/or data processing devices. Each of the memory 12a, 12b, 22a, and 32 may include read-only memory (ROM), a random access memory (RAM), a flash memory, a memory card, a storage medium and/or other storage devices. Each of the transceivers 13a, 13b, 23a, and 33 may include baseband circuitry and radio frequency (RF) circuitry to process radio frequency signals. When the embodiments are implemented in software, the techniques described herein may be implemented with modules, procedures, functions, entities, and so on, that perform the functions described herein. The modules may be stored in a memory and executed by the processors. The memory may be implemented within a processor or external to the processor, in which those may be communicatively coupled to the processor via various means are known in the art.

The network entity device 30 may be a node in a CN. CN may include LTE CN or 5G core (5GC) which includes user plane function (UPF), session management function (SMF), mobility management function (AMF), unified data management (UDM), policy control function (PCF), control plane (CP)/user plane (UP) separation (CUPS), authentication server (AUSF), network slice selection function (NSSF), and the network exposure function (NEF).

An example of the UE in the description may include one of the UE 10*a* or UE 10*b*. An example of the base station in the description may include the base station 20*a*. Uplink (UL) transmission of a control signal or data may be a transmission operation from a UE to a base station. Downlink (DL) transmission of a control signal or data may be a transmission operation from a base station to a UE. A DL control signal may comprise downlink control information (DCI) or a radio resource control (RRC) signal, from a base station to a UE.

Figure 2:
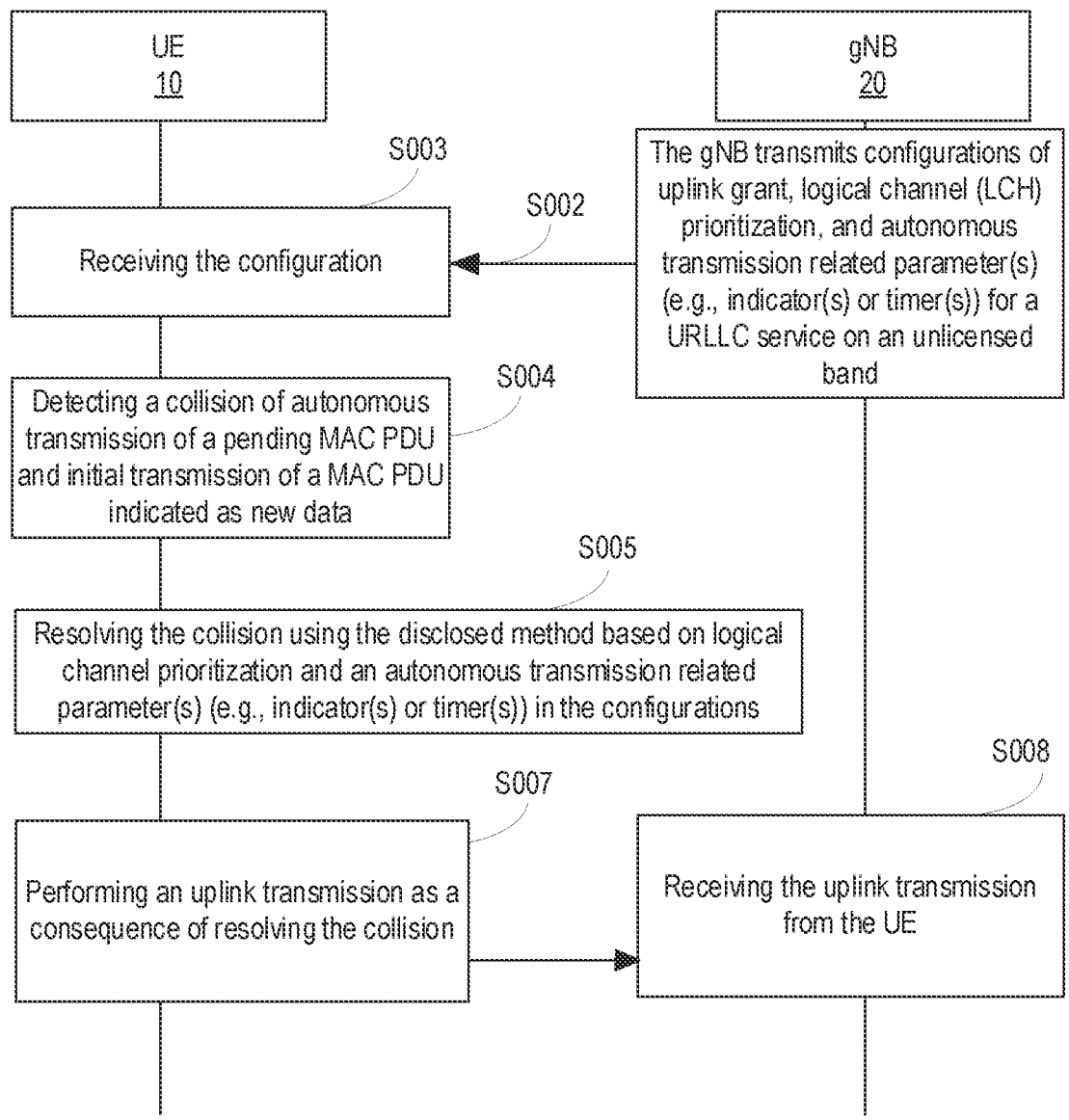
FIG. 2 illustrates a schematic view showing operations of a UE and a gNB.

With reference to FIG. 2, a gNB 20 executes a wireless communication method. The gNB 20 may comprise an embodiment of the base station 20*a*. Note that although the gNB 20 is described as an example in the description, the wireless communication method may be executed by a base station, such as another gNB, an eNB, a base station integrating an eNB and a gNB, or a base station for beyond 5G technologies. A UE 10 executes a wireless communication method. The UE 10 may comprise an embodiment of the UE 10*a* or UE 10*b*.

The gNB 20 generates (S001) and transmits (S002) configurations of uplink grant, logical channel (LCH) prioritization, and autonomous transmission related parameter(s) (e.g., indicator(s) or timer(s)) for a URLLC service on an unlicensed band to the UE 10. The UE 10 receives the configurations (S003). The autonomous transmission related parameter(s) may comprise one or more of an autonomous transmission indicator autonomousTX, a configured grant timer configuredGrantTimer, and a CG retransmission timer cg-RetransmissionTimer. The configurations of the LCH prioritization may comprise a logical channel based prioritization parameter lch-based Prioritization. Note that even though lch-BasedPrioritization is used as an example of a parameter in the description, any of other new defined parameters may be utilized in the embodiments of the disclosure to provide similar functions or operations in the embodiments. The lch-BasedPrioritization may comprise one of lch-BasedPrioritization-16 or lch-BasedPrioritization-r17 and may be named alternatively in other terms.

The UE 10 detects a collision of autonomous transmission of a pending MAC PDU and initial transmission of a MAC PDU indicated as new data (S004). The UE 10 resolves the collision event using the disclosed method based on logical channel prioritization and an autonomous transmission related parameter(s) (e.g., indicator and/or timer(s)) in the configurations (S005).

The UE 10 performs an uplink transmission as a consequence of resolving the collision (S007). The gNB 20 receives the uplink transmission from the UE (S008).

Figure 3:
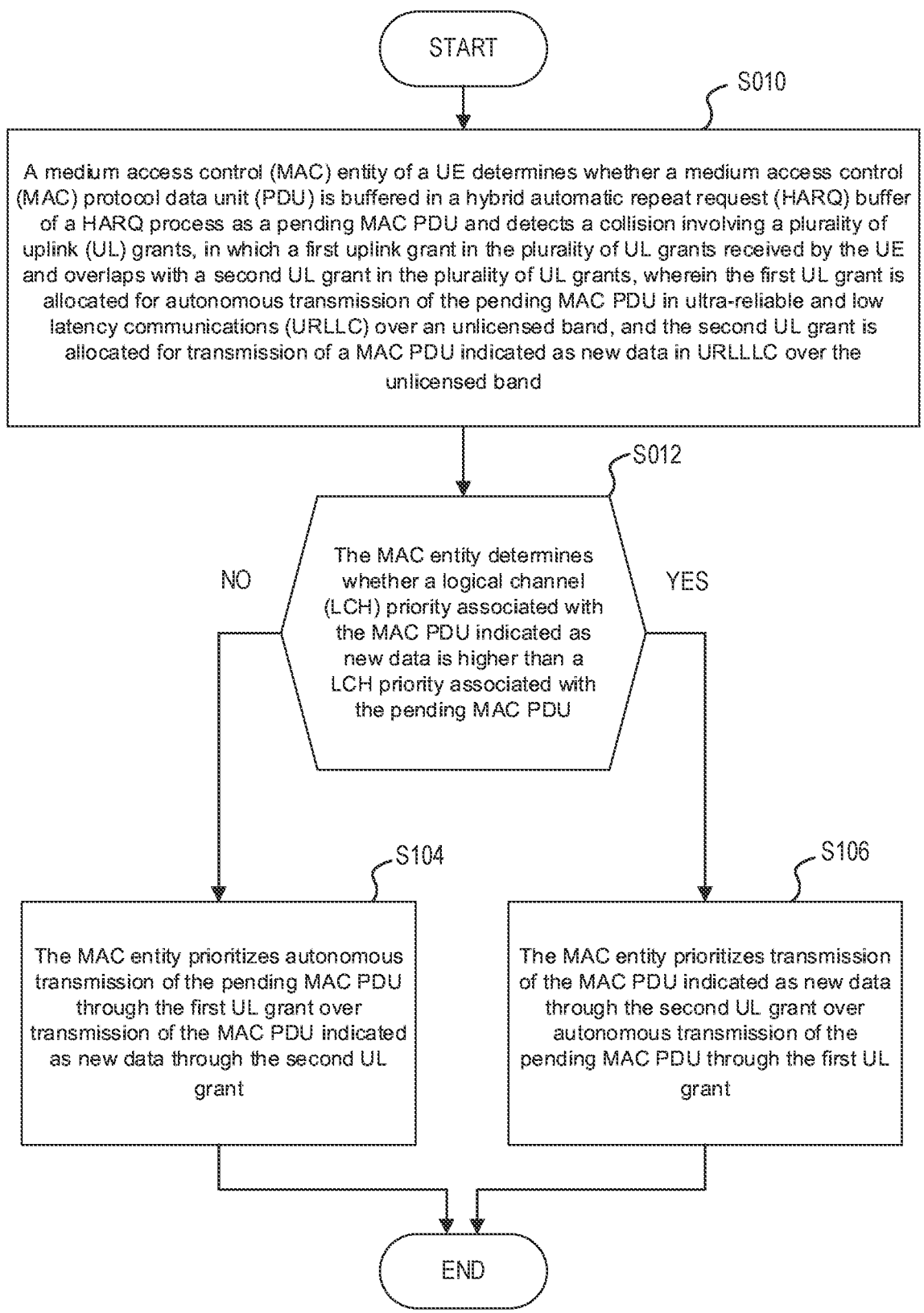
FIG. 3 illustrates a schematic view showing the disclosed method according to an embodiment of the disclosure.
Figure 4:
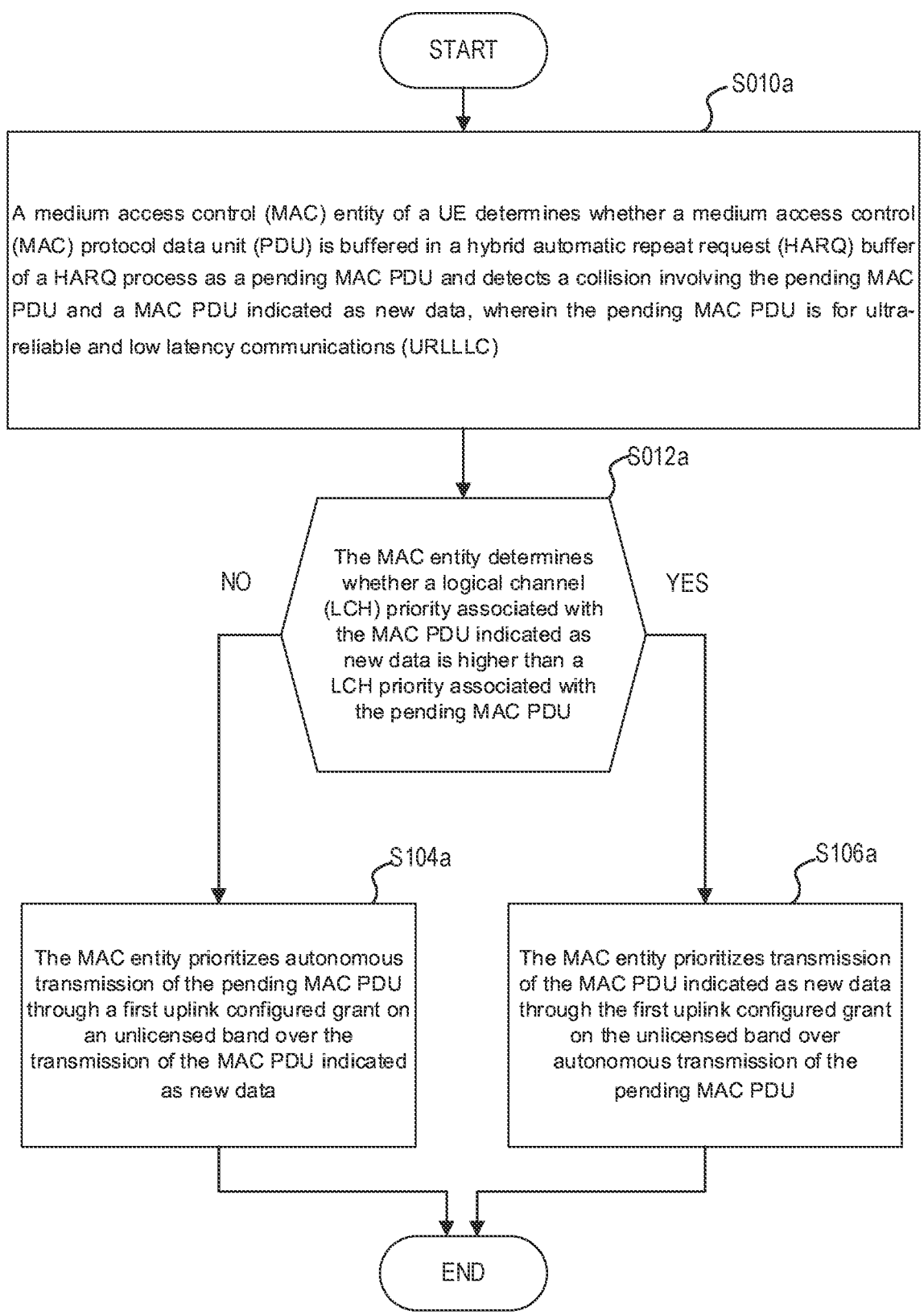
FIG. 4 illustrates a schematic view showing the disclosed method according to another embodiment of the disclosure.

Regarding the detecting and solving the collision in S004 and S005, an embodiment of the disclosed method is illustrated in FIG. 3, and another embodiment of the disclosed method is illustrated in FIG. 4.

With reference to FIG. 3, in an embodiment, a medium access control (MAC) entity of the UE 10 determines whether a medium access control (MAC) protocol data unit (PDU) is buffered in a hybrid automatic repeat request (HARQ) buffer of a HARQ process as a pending MAC PDU and detects a collision involving a plurality of uplink (UL) grants, in which a first UL grant in the plurality of UL grants received by the UE and overlaps with a second UL grant in the plurality of UL grants, wherein the first UL grant is allocated for autonomous transmission of the pending MAC PDU in ultra-reliable and low latency communications (URLLC) over an unlicensed band, and the second UL grant is allocated for transmission of a MAC PDU indicated as new data in URLLC over the unlicensed band (S010). The MAC entity 300 may perform the detecting of the collision before the determining as to whether a MAC PDU is buffered in the HARQ buffer of the HARQ process as the pending MAC PDU. Alternatively, the MAC entity 300 may perform the detecting of the collision after the determining as to whether a MAC PDU is buffered in the HARQ buffer of the HARQ process as the pending MAC PDU.

The MAC entity determines whether a logical channel (LCH) priority associated with the MAC PDU indicated as new data is higher than an LCH priority associated with the pending MAC PDU (S012). The MAC entity 300 may perform LCH-based prioritization for the plurality of UL grants received by the UE according to a Rel-17 new parameter. The MAC entity 300 may perform the LCH-based prioritization before the determining as to whether a MAC PDU is buffered in the HARQ buffer of the HARQ process as the pending MAC PDU. Alternatively, the MAC entity 300 may perform the LCH-based prioritization after the determining as to whether a MAC PDU is buffered in the HARQ buffer of the HARQ process as the pending MAC PDU.

The MAC entity prioritizes autonomous transmission of the pending MAC PDU through the first UL grant over transmission of the MAC PDU indicated as new data through the second UL grant when a logical channel (LCH) priority associated with the MAC PDU indicated as new data is not higher than an LCH priority associated with the pending MAC PDU (S104).

The MAC entity prioritizes transmission of the MAC PDU indicated as new data through the second UL grant over autonomous transmission of the pending MAC PDU through the first UL grant when the LCH priority associated with the MAC PDU indicated as new data is higher than the LCH priority associated with the pending MAC PDU (S106). When the transmission of the MAC PDU indicated as new data through the second UL grant is prioritized over the autonomous transmission of the pending MAC PDU through the first UL grant, the pending MAC PDU may be deprioritized by being queued in the HARQ buffer. Alternatively, when the transmission of the MAC PDU indicated as new data through the second UL grant is prioritized over the autonomous transmission of the pending MAC PDU through the first UL grant, the pending MAC PDU may be dropped.

With reference to FIG. 4, in an embodiment, a medium access control (MAC) entity of the UE 10 determines whether a medium access control (MAC) protocol data unit (PDU) is buffered in a hybrid automatic repeat request (HARQ) buffer of a HARQ process as a pending MAC PDU and detects a collision involving the pending MAC PDU and a MAC PDU indicated as new data, wherein the pending MAC PDU is for ultra-reliable and low latency communications (URLLC) (S010a). The MAC entity 300 may perform the detecting of the collision before the determining as to whether a MAC PDU is buffered in the HARQ buffer of the HARQ process as the pending MAC PDU. Alternatively, the MAC entity 300 may perform the detecting of the collision after the determining as to whether a MAC PDU is buffered in the HARQ buffer of the HARQ process as the pending MAC PDU.

The MAC entity determines whether a logical channel (LCH) priority associated with the MAC PDU indicated as new data is higher than an LCH priority associated with the pending MAC PDU (S012a). The MAC entity 300 may perform LCH-based prioritization for the plurality of UL grants received by the UE according to a Rel-17 new parameter. The MAC entity 300 may perform the LCH-based prioritization before the determining as to whether a MAC PDU is buffered in the HARQ buffer of the HARQ process as the pending MAC PDU. Alternatively, the MAC entity 300 may perform the LCH-based prioritization after the determining as to whether a MAC PDU is buffered in the HARQ buffer of the HARQ process as the pending MAC PDU.

The MAC entity prioritizes autonomous transmission of the pending MAC PDU through a first uplink configured grant on an unlicensed band over the transmission of the MAC PDU indicated as new data when a logical channel (LCH) priority associated with the MAC PDU indicated as new data is not higher than an LCH priority associated with the pending MAC PDU (S104a). The MAC entity prioritizes transmission of the MAC PDU indicated as new data through the first uplink configured grant on the unlicensed band over autonomous transmission of the pending MAC PDU when the LCH priority associated with the MAC PDU indicated as new data is higher than the LCH priority associated with the pending MAC PDU (S106a). When the transmission of the MAC PDU indicated as new data through the second UL grant is prioritized over the autonomous transmission of the pending MAC PDU through the first UL grant, the pending MAC PDU may be deprioritized by being queued in the HARQ buffer. Alternatively, when the transmission of the MAC PDU indicated as new data through the second UL grant is prioritized over the autonomous transmission of the pending MAC PDU through the first UL grant, the pending MAC PDU may be dropped.

Figure 5:
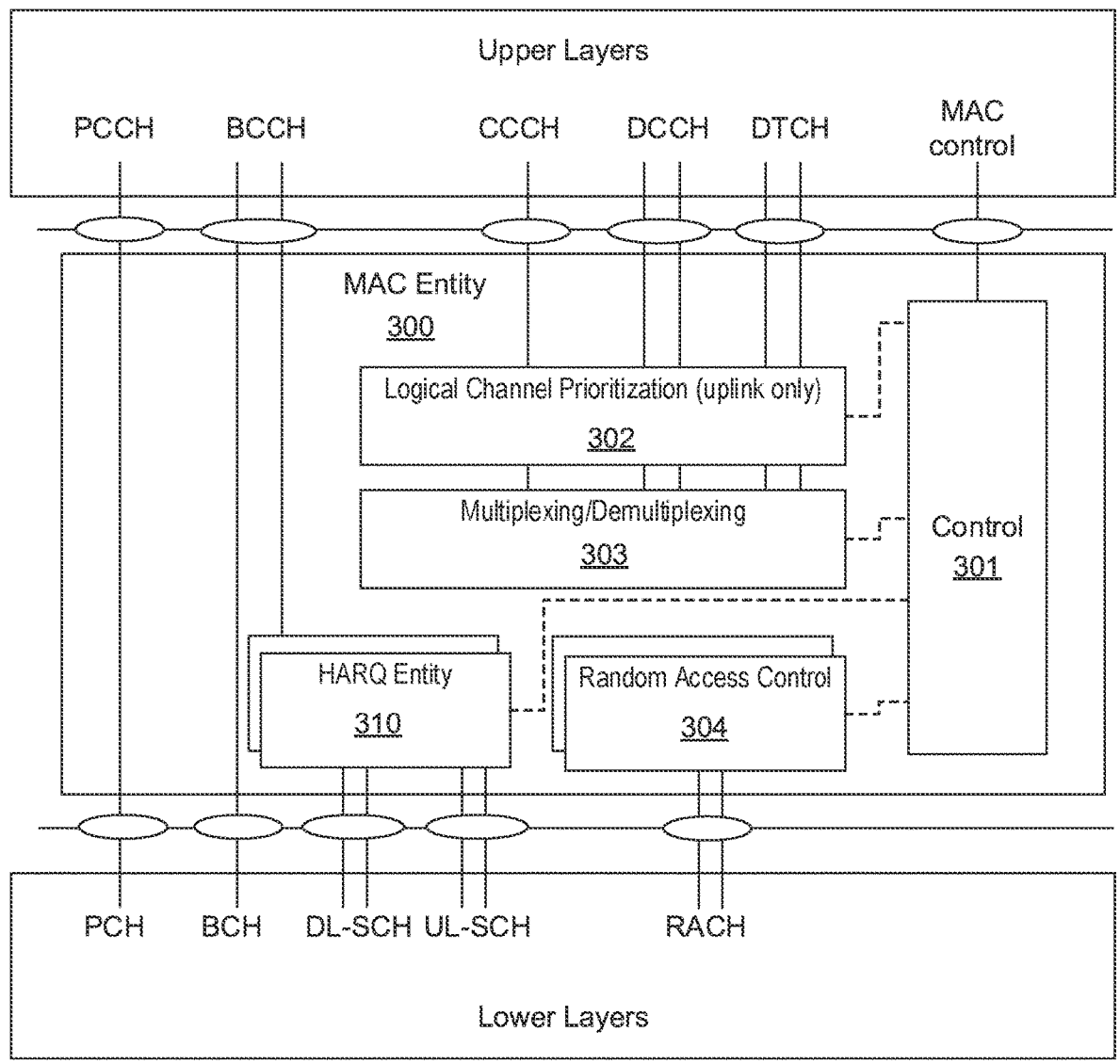
FIG. 5 illustrates a schematic view of a medium access control (MAC) entity, a lower layer, and an upper layer.

With reference to FIG. 5, an embodiment of the MAC entity of the UE 10 comprises a MAC entity 300. The MAC entity 300 operates with upper layers and lower layers, which are defined in 3GPP related standards. The MAC entity 300 interacts with the upper layers through a paging control channel (PCCH), broadcast control channel (BCCH), common control channel (CCCH), dedicated control channel (DCCH), dedicated traffic channel (DTCH), and a MAC control. The MAC entity 300 interacts with the lower layers through a paging channel (PCH), broadcast channel (BCH), downlink shared channel (DL-SCH), uplink shared channel (UL-SCH), and random access channel (RACH). The MAC entity 300 comprises units 301, 302, 303, 304, and 310, the formal definition of which may be referred in related 3GPP standards. The unit 301 is a control unit for controlling operations of units in the MAC entity 300. The unit 302 is an LCH prioritization unit that performs LCH prioritization. The unit 303 is a multiplexing and demultiplexing unit that performs multiplexing and demultiplexing for protocol data units (PDUs) and service data units (SDUs). The unit 304 is a random access control unit that performs operations of random access channel (RACH). The unit 310 is a HARQ entity that performs HARQ functions.

In some embodiments of the disclosure, the MAC entity 300 determines a cause of pending the pending MAC PDU in the HARQ buffer of the HARQ process. When determining the cause of pending the pending MAC PDU in the HARQ buffer of the HARQ process is listen before talk (LBT) failure, the MAC entity 300 may perform the autonomous transmission of the pending MAC PDU according to a configured grant retransmission timer. The configured grant retransmission timer may comprise a parameter cg-RetransmissionTimer. When determining the cause of pending the pending MAC PDU in the HARQ buffer of the HARQ process is that the pending MAC PDU has been deprioritized, the MAC entity 300 may perform the autonomous transmission of the pending MAC PDU according to an autonomous transmission indicator. The autonomous transmission indicator comprises a parameter autonomousTX. The MAC entity may perform the autonomous transmission of the pending MAC PDU according to a parameter cg-RetransmissionTimer. The MAC entity 300 may perform determining as to whether a cause of pending the pending MAC PDU in the HARQ buffer of the HARQ process is listen before talk (LBT) failure before determining as to whether the cause of pending the pending MAC PDU in the HARQ buffer of the HARQ process is that the pending MAC PDU has been deprioritized. The MAC entity 300 may perform the autonomous transmission of the pending MAC PDU using a HARQ process identifier (HID) of the HARQ process, and the HID of the HARQ process is shared by different uplink configured grants.

The MAC entity 300 may perform the determining as to whether an LBT failure indication is sent from the lower layer of the MAC entity of the UE before the determining as to whether a MAC PDU is buffered in the HARQ buffer of the HARQ process as the pending MAC PDU. Alternatively, the MAC entity performs the determining as to whether an LBT failure indication is sent from the lower layer of the MAC entity of the UE after the determining as to whether a MAC PDU is buffered in the HARQ buffer of the HARQ process as the pending MAC PDU.

Figure 6:
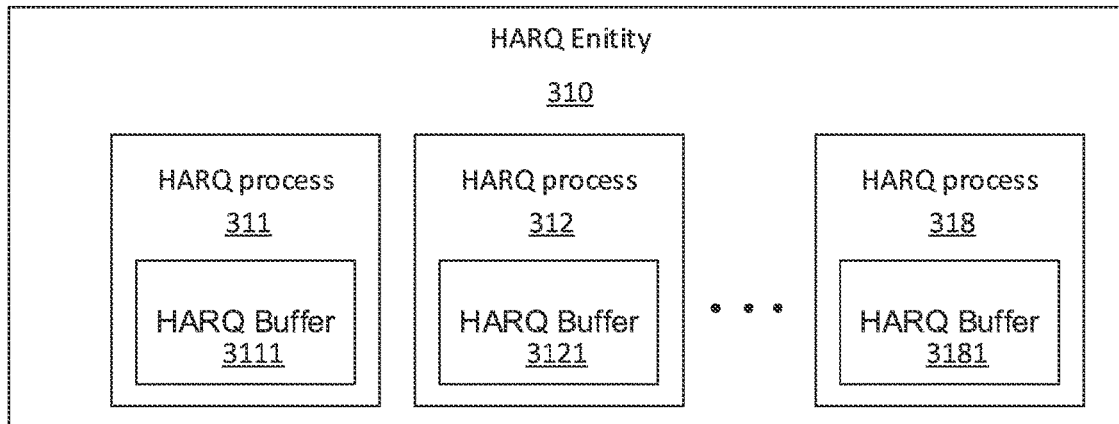
FIG. 6 illustrates a schematic view of a hybrid automatic repeat request (HARQ) entity.

With reference to FIG. 6, the HARQ entity 310 may operate a plurality of HARQ processes, such as HARQ processes 311, 312, . . . and 318. Each HARQ process maintains a HARQ buffer for buffering MAC PDU(s). For example, the HARQ process 311 comprises a HARQ buffer 3111, the HARQ process 312 comprises a HARQ buffer 3121, and the HARQ process 318 comprises a HARQ buffer 3181. Unless otherwise specified, a HARQ entity in the description may refer to the HARQ entity 310, and a MAC entity in the description may refer to the MAC entity 300. Embodiments of the disclosure can be executed by the MAC entity 300 in a MAC layer of the UE 10 and a MAC entity in the MAC layer of the gNB 20.

The disclosure provides embodiments of processing the logical channel (LCH) prioritization for the configured grant (CG) operated in an unlicensed controlled environment (UCE). As described in 3GPP document RP-201310, the UCE is defined as an environment which contains only devices operating on the unlicensed band installed by the facility owner and where unexpected interference from other systems and/or radio access technology only sporadically happens.

The IE MAC-CellGroupConfig is used to configure MAC parameters for a cell group, including discontinuous reception (DRX). Definition of MAC-CellGroupConfig is shown in the following excerpt extracted from TS 38.331 subclause 6.3.2 "Radio resource control information elements" and TS 38.321.

TABLE 5

MAC-CellGroupConfig information element

```
-- ASN1START
-- TAG-MAC-CELLGROUPCONFIG-START
MAC-CellGroupConfig ::= SEQUENCE {
    ...
    lch-BasedPrioritization-r16   ENUMERATED {enabled}    OPTIONAL,   -- Need R
    ...
}
-- TAG-MAC-CELLGROUPCONFIG-STOP
-- ASN1STOP
```

TABLE 6

MAC-CellGroupConfig field descriptions
lch-BasedPrioritization-r16

If this field is present, the corresponding MAC entity of the UE is configured with prioritization between overlapping grants and between a scheduling request and overlapping grants based on LCH priority, see TS 38.321.

The parameter lch-BasedPrioritization-r17 is included in an information element (IE) MAC-CellGroupConfig. The IE MAC-CellGroupConfig is used to configure MAC parameters for a cell group, including DRX.

TABLE 7

MAC-CellGroupConfig information element including Rel-17 parameters

```
-- ASN1START
-- TAG-MAC-CELLGROUPCONFIG-START
MAC-CellGroupConfig ::= SEQUENCE {
    ...
    lch-BasedPrioritization-r16   ENUMERATED {enabled}    OPTIONAL,   -- Need R
    lch-BasedPrioritization-r17   ENUMERATED {enabled}    OPTIONAL,   -- Need R
    ...
}
-- TAG-MAC-CELLGROUPCONFIG-STOP
-- ASN1STOP
```

TABLE 8

MAC-CellGroupConfig field descriptions - lch-BasedPrioritization-r17
lch-BasedPrioritization-r17

If this field is present, the corresponding MAC entity of the UE is configured with prioritization between overlapping grants and between scheduling request and overlapping grants based on LCH priority, and with prioritization between new arriving SDU(s) and existing MAC PDU within a configured grant.

The IE ConfiguredGrantConfig is configured grant (CG) configuration used to configure uplink transmission without dynamic grant according to two possible schemes. The actual UL grant may either be configured via radio resource control (RRC) (type1) or provided via the physical downlink control channel (PDCCH) (addressed to CS-RNTI) (type2). The CS-RNTI stands for CS-RNTI configured scheduling-radio network temporary identifier (CS-RNTI). One or more CG configurations may be configured in one bandwidth part (BWP) of a serving cell for the UE 10. The IE ConfiguredGrantConfig is shown in the following.

TABLE 9

ConfiguredGrantConfig information element

```
-- ASN1START
-- TAG-CONFIGUREDGRANTCONFIG-START
...
    configuredGrantTimer         INTEGER (1..64)        OPTIONAL,   -- Need R
    cg-RetransmissionTimer-r16   INTEGER (1..64)        OPTIONAL,   -- Need R
    autonomousTX-r16             ENUMERATED {enabled}   OPTIONAL    -- Cond
LCH-BasedPrioritization
    ...
```

TABLE 10

ConfiguredGrantConfig field descriptions
ConfiguredGrantConfig field descriptions autonomousTX If this field is present, the Configured Grant configuration is configured with autonomous transmission, see TS 38.321.

cg-RetransmissionTimer

Indicates the initial value of the configured grant retransmission timer (see TS 38.321) in multiples of periodicity. The value of cg-RetransmissionTimer is always less than or equal to the value of configuredGrantTimer. This field is always configured for operation with unlicensed spectrum together with harq-ProcID-Offset. This field is not configured for operation in licensed spectrum or simultaneously with harq-ProcID-Offset2.

configuredGrantTimer

Indicates the initial value of the configured grant timer (see TS 38.321) in multiples of periodicity. When cg-RetransmissionTimer is configured, if HARQ processes are shared among different configured grants on the same BWP, configuredGrantTimer * periodicity is set to the same value for the configurations that share HARQ processes on this BWP.

Operations for configuredGrantTimer and cg-RetransmissionTimer

Figure 7:
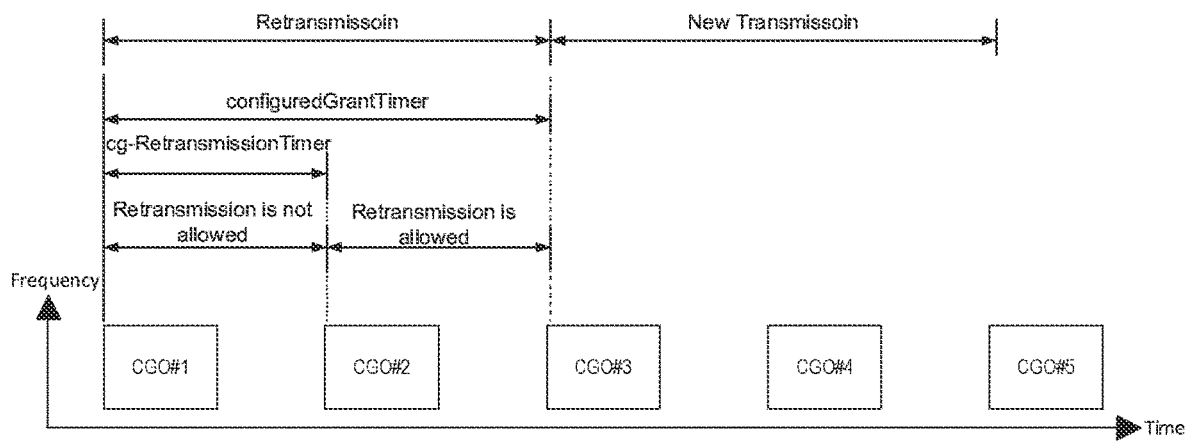
FIG. 7 illustrates a schematic view showing configurations of a configured grant timer configuredGrantTimer and a CG retransmission timer cg-RetransmissionTimer.

FIG. 7 illustrates a schematic view showing configurations of a configured grant timer configuredGrantTimer and a CG retransmission timer cg-RetransmissionTimer.

A configuredGrantTimer is configured for each CG configuration.

A value of the configuredGrantTimer is configured as a multiple of a CG periodicity of a CG configuration.

The configuredGrantTimer is started when a MAC PDU associated with the CG is transmitted for a CG opportunity (CGO).

The configuredGrantTimer is stopped when a dynamic grant (DG) is scheduled by the gNB 20 for retransmission of the MAC PDU.

Before the configuredGrantTimer expires (i.e., when the configuredGrantTimer is running), only retransmission of the MAC PDU is allowed.

After the configuredGrantTimer expires, which means no DG is scheduled by the gNB 20 for retransmission, new transmission of the next MAC PDU associated with the CG is allowed.

When a CG (e.g., the CG) is deprioritized (i.e., autonomousTX is configured), the configuredGrantTimer is stopped. There are two sub-scenarios. In a first scenario, the CG is transmitted and then be deprioritized, the configuredGrantTimer is stopped because the gNB 20 will schedule a DG for retransmitting the existing MAC PDU and new MAC PDU could be transmitted on the next CGO. In a second scenario, the CG is deprioritized before transmission, the configuredGrantTimer is not started and the MAC PDU could be a new transmission on the next CGO.

The timer autonomousTX is used to trigger a new CG transmission after the configuredGrantTimer expires. When the configuredGrantTimer is running, autonomousTX has no effect.

A cg-RetransmissionTimer is configured for each CG operated on unlicensed spectrum.

A value of the cg-RetransmissionTimer is configured as a multiple of a CG periodicity of a CG configuration, and the value of cg-RetransmissionTimer is always less than or equal to the value of configuredGrantTimer.

The cg-RetransmissionTimer is started when a MAC PDU associated with the CG is transmitted for a CG opportunity (CGO).

Before the cg-RetransmissionTimer expires (i.e., when the cg-RetransmissionTimer is running), retransmission of the MAC PDU is not allowed. The MAC entity 300 determines whether an LBT failure indication is sent from a lower layer of the MAC entity of the UE. If the cg-RetransmissionTimer is started and LBT failure indication is received from the lower layers before the cg-RetransmissionTimer expires, the HARQ process of the MAC PDU is configured as pending.

After the cg-RetransmissionTimer expires, retransmission of the existing MAC PDU is allowed.

In 3GPP Rel-17 standards, when a CG (e.g., the CG) is deprioritized (i.e., autonomousTX may be or may be not configured), the cg-RetransmissionTimer is stopped. Since the cg-RetransmissionTimer is stopped, the MAC PDU could be retransmitted.

Whether and how logical channel (LCH)-based prioritization can be configured with cg-RetransmissionTimer are still under investigation.

If a configured grant is deprioritized and/or gNB didn't get it (e.g., LBT failure and/or transmission failure) then a UE should be able to autonomously re-transmit it.)

Configurations for lch-based Prioritization, autonomousTX, and cg-RetransmissionTimer are further detailed in the following.

lch-basedPrioritization is a parameter for a specific logical channel which is configured by RRC information element (1E) MAC-CellGroupConfig, which is used to configure MAC parameters for a cell group. The MAC-CellGroupConfig IE is carried in another RRC IE CellGroupConfig, which is used to configure a master cell group (MSG) or secondary cell group (SCG). The CellGroupConfig is carried in an RRC message (e.g., RRCReconfiguration, RRCResume, RRCSetup). In other words, after a UE completes a random access procedure or an attach procedure, it may be configured with lch-basedPrioritization depending on the MAC configurations by the gNB.

autonomousTX and cg-RetransmissionTimer are parameters for a configured grant which is configured by RRC IE ConfiguredGrantConfig. The ConfiguredGrantConfig is carried in another RRC IE BWP-UplinkDedicated, which is used to configure the UE specific parameters of an uplink bandwidth part (BWP). The BWP-UplinkDedicated is carried in another RRC IE ServingCellConfig, which is used to configure the UE with a serving cell. The ServingCellConfig is carried in another RRC IE CellGroupConfig, which is used to configure a master cell group (MSG) or secondary cell group (SCG). The CellGroupConfig is carried in an RRC message (e.g., RRCReconfiguration, RRCResume, RRCSetup). In other words, after a UE completes random access procedure or attach procedure, it may be configured with autonomousTX and/or cg-RetransmissionTimer depending on the configured grant configuration by the gNB.

The gNB 20 may configure any combination of lch-basedPrioritization, autonomousTX, cg-RetransmissionTimer for Rel-17 UE (e.g., the UE 10) with IIoT/URLLC capability.

TABLE 11

Features supported by 3GPP standard Rel-16 and Rel-17

| | Rel-16 URLLC | Rel-16 NR-U | Rel-17 IIoT/ URLLC (option 1) | Rel-17 IIoT/ URLLC (option 2) | Rel-17 IIoT/ URLLC (option 3) |
|---|---|---|---|---|---|
| lch-basedPrioritization | supported | not supported | supported | supported | supported |
| autonomousTX | supported | not supported | supported | not supported | supported |
| cg-RetransmissionTimer | not supported | supported | supported | supported | not supported |

Note that for Rel-16 UE with URLLC capability, the UE is configured with lch-basedPrioritization and autonomousTX.

For Rel-16 UE with NR-U capability, the UE is configured with cg-RetransmissionTimer.

For Rel-17 UE with IIoT/URLLC capability (option 1), the UE may be configured with lch-basedPrioritization, autonomousTX, cg-RetransmissionTimer simultaneously. The operation for resolving the CGs collision, LCH prioritization and LBT follows the embodiment 3/3a/3b/3c. This configuration is suitable for environments with some interference from other systems.

For Rel-17 UE with IIoT/URLLC capability (option 2), the UE may be configured with lch-basedPrioritization and cg-RetransmissionTimer. The operation for resolving the CGs collision, LCH prioritization and LBT follows the rule of Rel-16 NR-U. This configuration is suitable for the environments with more interference from other systems. The deprioritized MAC PDU may be retransmitted after the cg-RetransmissionTimer expires.

For Rel-17 UE with IIoT/URLLC capability (option 3), the UE may be configured with lch-basedPrioritization, and autonomousTX. The operation for resolving the CGs collision and LCH prioritization follows the rule of Rel-16 URLLC. This configuration is suitable for the environments with no interference from other systems, or the interference is controllable.

Figure 8:
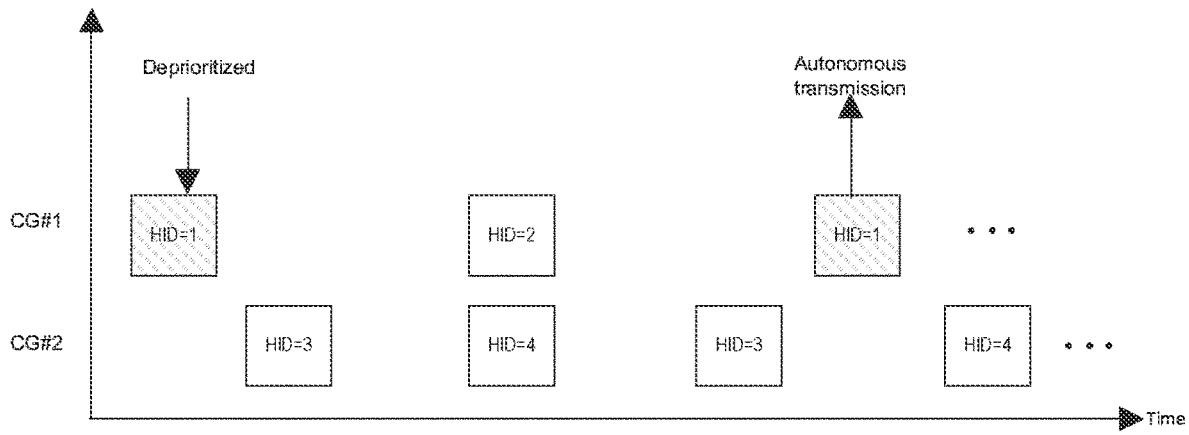
FIG. 8 illustrates a schematic view showing an example of autonomous transmission for URLLC.

Embodiment 1: Network Configures UE with lch-basedPrioritization and autonomousTX to Enable the LCH Prioritization on Licensed Spectrum or UCE With reference to FIG. 8, CG #1 in the FIG. 8 represents a first CG configuration, and CG #2 in the FIGS. represents a second CG configuration.

For URLLC on licensed spectrum, when autonomousTX is configured and a CG carrying a MAC PDU is deprioritized, the UE 10 may transmit the MAC PDU of the deprioritized CG at the subsequent CG of same CG configuration with the same HARQ process identifier (HID). The MAC PDU of the deprioritized CG is referred to as a deprioritized MAC PDU. As shown in FIG. 8, if the CG with HID=1 is deprioritized, the UE 10 will autonomously transmit the MAC PDU of the deprioritized CG in the subsequent CG with HID=1. If lch-basedPrioritization is configured, the UE 10 autonomously transmits the MAC PDU after determining that the LCH priority of the MAC PDU of the CG is the highest among UL grants overlapping in time. If the number of HID for a CG and/or the number of CG configuration is large, the deprioritized MAC PDU may experience significant delays. To ensure the Quality of Service (QoS), the gNB 20 can schedule a dynamic grant for the UE 10 to transmit the remaining data of an LCH associated with the deprioritized CG (e.g., the MAC PDU of the deprioritized CG). Since the HID of a CG is assigned by the following formula (1) based on the subframe and slot number, the gNB 20 can schedule the dynamic grant with an HID other than the HID of the CG such that the collision of HID will not happen.

$$\text{HARQ Process ID} = [\text{floor}(\text{CURRENT\_symbol}/\text{periodicity})] \bmod \text{nrofHARQ-Processes} + \text{harq-procID-offset2} \quad (1)$$

where floor( ) is a floor function;
modulo is a modulo operator;
CURRENT_symbol=(SFN×numberOfSlotsPerFrame× numberOfSymbolsPerSlot+slot number in the frame×numberOfSymbolsPerSlot+symbol number in the slot);
numberOfSlotsPerFrame refers to the number of consecutive slots per frame; and
numberOfSymbolsPerSlot refers to the number of consecutive symbols per slot.

For URLLC operated in UCE, since the Listen Before Talk (LBT) failure is sporadic, a CG which cannot be transmitted because of LBT failure can be a deprioritized CG. A MAC PDU for the CG with LBT failure is not encapsulated in the MAC entity 300. The MAC PDU can be autonomously transmitted on the subsequent CG following the same rule as URLLC on the licensed band.

Figure 9:
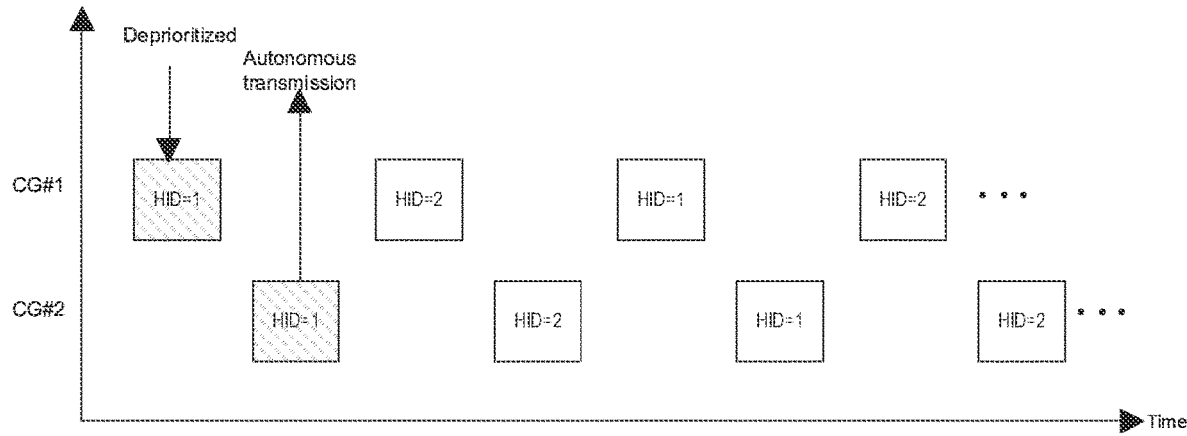
FIG. 9 illustrates a schematic view showing an example of autonomous transmission enhancements for Rel-17 IIoT/URLLC using the same HARQ process identifier (HID).

However, even the LBT failure probability from unexpected devices is low, the QoS of LCH(s) will still be affected. To ensure the QoS for a URLLC LCH (but be deprioritized by another LCH with a higher priority), a deprioritized MAC PDU of the URLLC LCH should be able to be transmitted on a CG of different CG configuration if the CG is configured with the same (or larger) transport block size (TBS) and/or with the same or higher reliability. For example, in FIG. 9, if the CG with HID=1 is deprioritized, the UE 10 will autonomously transmit the MAC PDU in CG #2 with the same HID. In this example, a HARQ process (e.g., a HARQ process with HID=1) can be shared between different CG configurations. The aforementioned formula (e.g., by configuring appropriate harq-procID-offset2) can be reused for assigning the shared HID among different CG configurations, except that the same HID should not be assigned for the CG grants overlapping in time. (Note that because the deprioritized CG with the associated MAC PDU is buffered in a HARQ process buffer with HID=1, the HARQ entity 310 keeps the HID not changed until the CG is transmitted from the HARQ process.) CG #1 in FIG. 9 represents a first CG configuration, and CG #2 in the FIGS. represents a second CG configuration.

Figure 10:
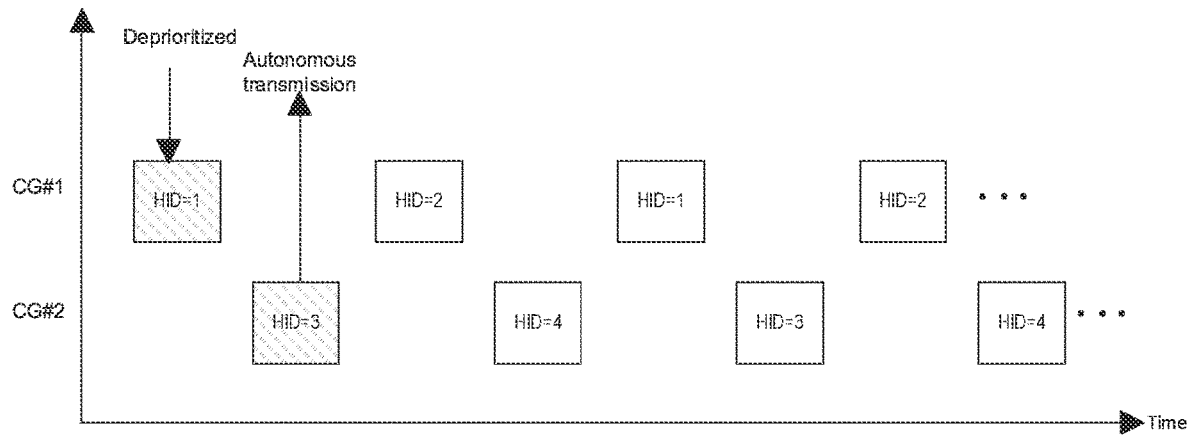
FIG. 10 illustrates a schematic view showing an example of autonomous transmission enhancements for Rel-17 IIoT/URLLC using different HIDs.

For the other example in FIG. 10, if the CG with HID=1 is deprioritized, the UE 10 will autonomously transmit the MAC PDU in CG #2 with a different HID=3. CG #1 in the FIGS. represents a first CG configuration, and CG #2 in the FIGS. represents a second CG configuration. In this example, a HARQ process (e.g., a HARQ process with HID=1) is not shared between different CG configurations, but the HARQ processes of CG #1 and CG #2 may belong to a group such that the HARQ processes can be used for transmitting the deprioritized MAC PDU. The HARQ processes within the same group should be used for the CG configurations with the same TBS, modulation and coding scheme (MCS) table, and/or reliability.

Figure 11:
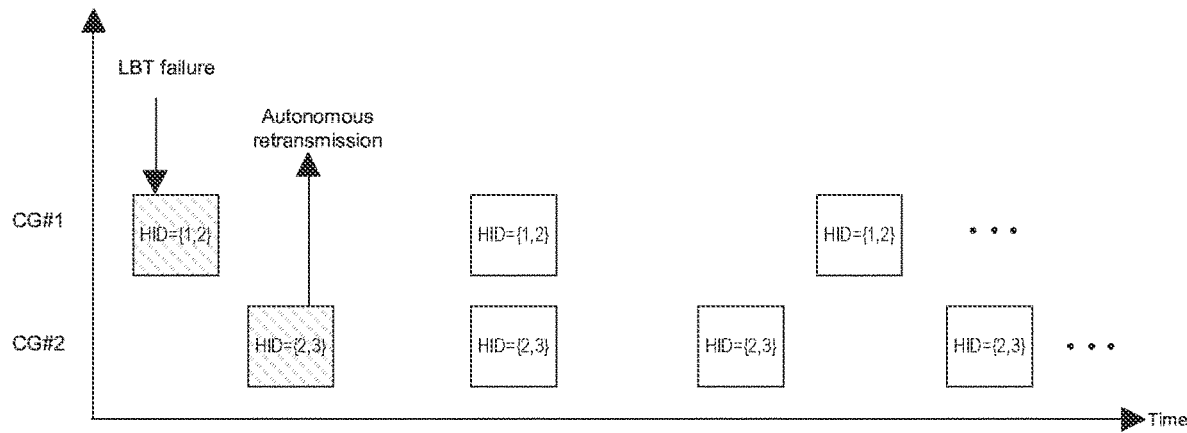
FIG. 11 illustrates a schematic view showing an example of autonomous transmission for NR-U.

Embodiment 2: Network Configures UE with lch-basedPrioritization and cg-RetransmissionTimer to Enable the LCH Prioritization on Unlicensed Spectrum FIG. 11 illustrates a schematic view showing an example of autonomous transmission for NR-U. For NR-U on unlicensed spectrum, when cg-RetransmissionTimer is configured, and a CG is blocked by LBT failure (i.e., cg-RetransmissionTimer is not started) or no acknowledgment is received (i.e., cg-RetransmissionTimer is started and expired), the UE 10 can retransmit the MAC PDU via CGs of different CG configurations using an HID which is selected among a set of assigned HIDs for one of the CG configurations. The premise that the MAC PDU can be transmitted on CG configurations is the CG configurations has the same TBS. Unlike the HID assignment by the formula in URLLC, the HIDs for a CG configuration are configured by the gNB 20 first and then selected by the UE 10 when the CG is transmitted. Because the gNB 20 does not know which HID was selected by the UE 10, the UE 10 reports the selected HID on Uplink Control Information (UCI) to synchronize the HID with the gNB 20. As shown in FIG. 11, if the first CG in CG #1 encounters an LBT failure, the UE 10 may autonomously transmit the MAC PDU at the first CG of CG #2 by the selected HID=2 which is selected by the UE 10 from {2,3}. Note that the UE 10 may select the same HID in different CG configurations because HID sharing is allowed in Rel-16 NR-U. In order to accelerate the uplink transmission to satisfy LCH's QoS in an unpredictable environment, autonomous retransmission is performed on different CG configurations, and the retransmission is prioritized over the initial transmission.

Figure 12:
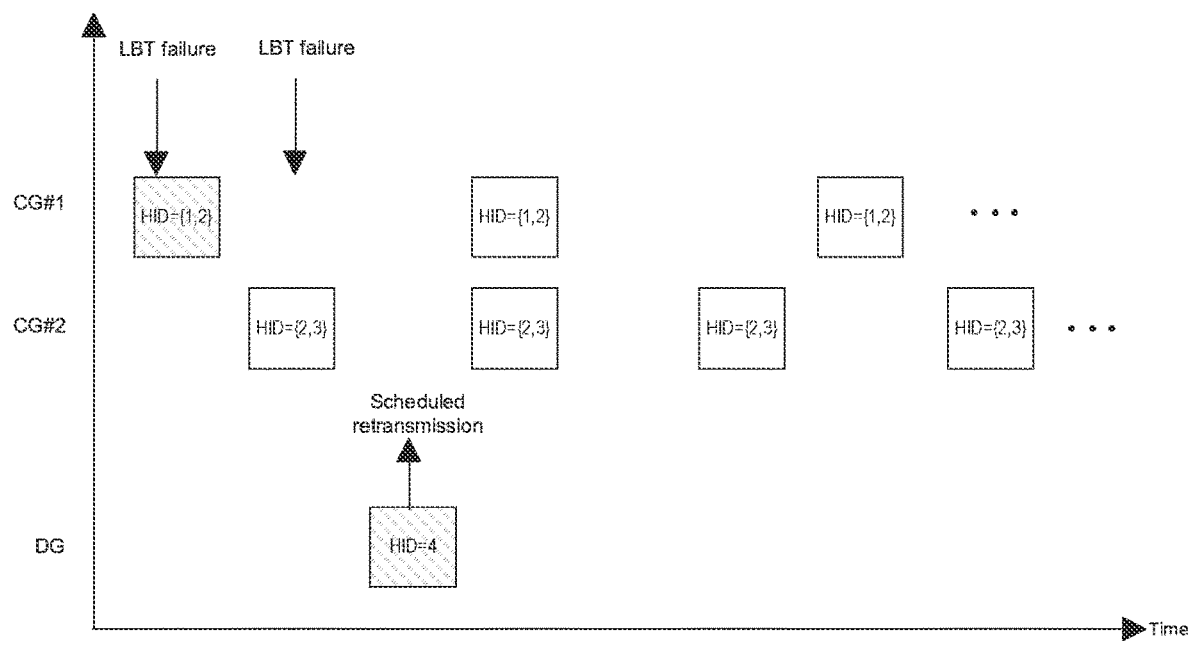
FIG. 12 illustrates a schematic view showing an example of scheduled retransmission for Rel-17 IIoT/URLLC on unlicensed spectrum.

In Rel-16 NR-U, prioritization between different services is not considered. To perform prioritization between LCHs for different services, the UE 10 and the gNB 20 can reuse the rules and features of LCH-based prioritization. When lch-basedPrioritization is configured for Rel-17 IIoT/URLLC on unlicensed spectrum, the UE 10 first compares the LCH priorities between the to-be-retransmitted MAC PDU(s) (e.g., a pending MAC PDU or a MAC PDU indicated as new data) and/or the potential MAC PDU(s) on multiple CGs overlapping in time, and then autonomously retransmits the MAC PDU with the highest LCH priority. If LBT failure happens continuously, the to-be-retransmitted MAC PDU may experience significant delays. A potential MAC PDU of a CG means a portion or an entirety of a MAC SDU from logical channel(s), which has not been buffered in a HARQ buffer. SDU may carry data. Each of the to-be-retransmitted MAC PDU and/or the potential MAC PDU may be loaded into a UL grant according to logical channels of the to-be-retransmitted MAC PDU(s) and/or the potential MAC PDU(s). To ensure QoS, the gNB 20 can schedule a dynamic grant for the UE 10 to transmit the remaining data of the LCH. Since the HIDs of a CG are assigned by the gNB 20 and be selected by the UE 10, the gNB 20 may not know which HID the UE 10 may select. When scheduling the dynamic grant which overlaps with one or more CGs in time, the gNB 20 should assign the dynamic grant with an HID other than the set of HIDs for CGs of the CG configurations such that the collision of HID will not happen. FIG. 12 shows that the gNB 20 schedules a dynamic grant (DG) with HID=4 for the UE 10 to transmit the retransmitted MAC PDU after continuous LBT failures.

In FIG. 12, DG represents dynamic grant configuration, CG #1 represents a first CG configuration, and CG #2 in the FIGS. represents a second CG configuration.

Figure 13:
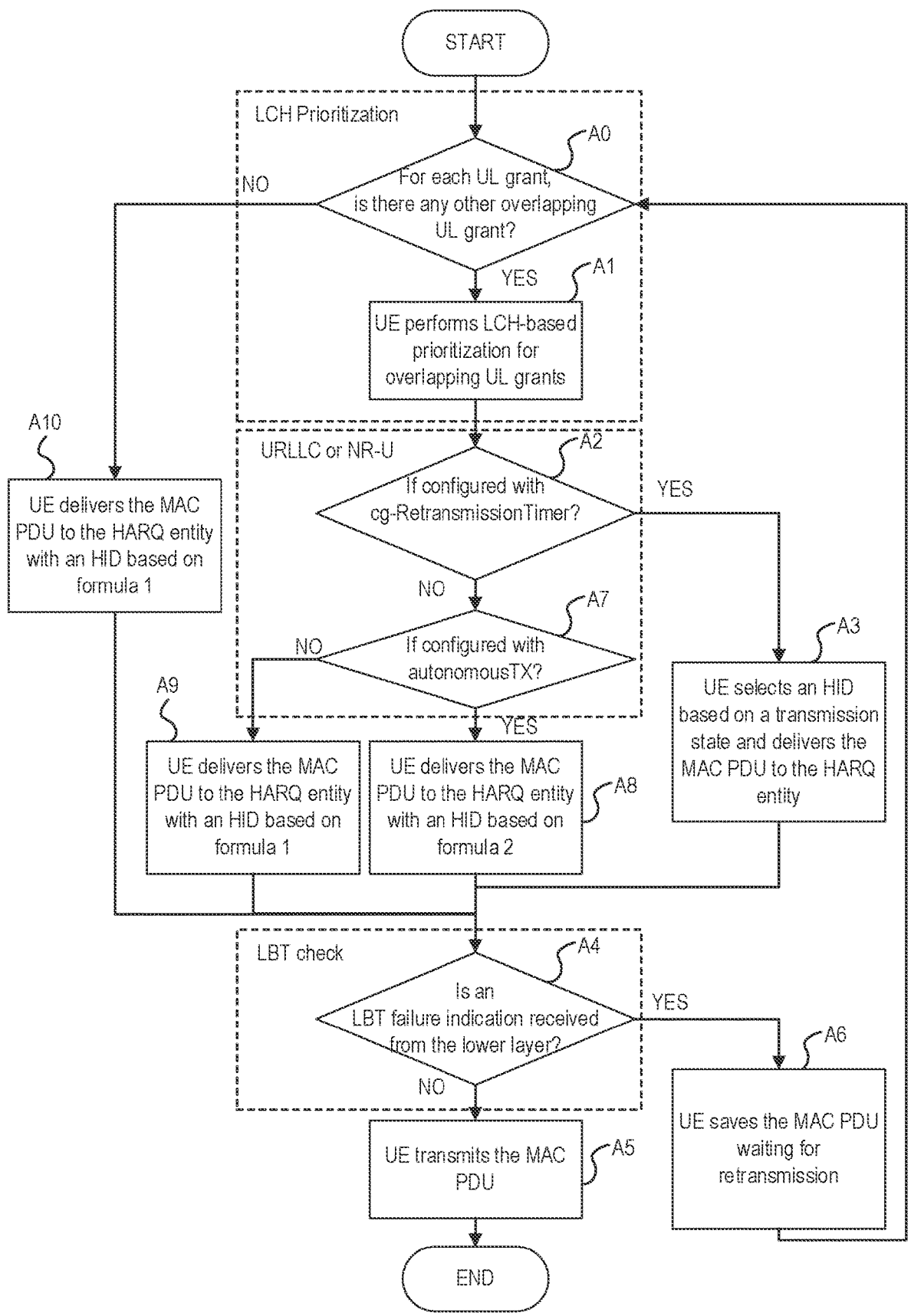
FIG. 13 illustrates a schematic view showing UE operation when configured with a logical channel based prioritization parameter lch-based Prioritization, an autonomous transmission indicator autonomousTX, and cg-RetransmissionTimer according to an embodiment of the disclosure.

Embodiment 3: Network Configures UE with lch-basedPrioritization, autonomousTX, and cg-RetransmissionTimer to Enable the LCH Prioritization on Licensed Spectrum or UCE In this scenario, the gNB 20 simultaneously configures the UE 10 with lch-basedPrioritization, autonomousTX, and cg-RetransmissionTimer. FIG. 13 shows a flow chart of the UE operation when simultaneously configured with lch-basedPrioritization, autonomousTX, and cg-RetransmissionTimer. The flow chart is in the order of LCH prioritization, NR-U or URLLC check, and LBT check.

The UE 10 may perform LCH prioritization for the overlapping UL grants if lch-basedPrioritization is configured, where LCH priorities can be assigned to logical channels, of which each logical channel is assigned one LCH priority. For example, a first logical channel is assigned a first LCH priority, such as the highest priority or another priority. When the UE 10 transmits MAC PDU(s) on the first logical channel, the first LCH priority of the first logical channels becomes the priority of the MAC PDU(s). When the UE 10 transmits the MAC PDU(s) on a UL grant, the priority of the MAC PDU priority becomes the priority of the UL grant.

For example, with reference to TS 38.321 section 5.4.1, for the MAC entity 300 configured with lch-basedPrioritization, priority of an UL grant is determined by the highest priority among priorities of the logical channels that are multiplexed (i.e., the data from the logical channels has been encapsulated to a to-be-(re)transmitted MAC PDU which is already stored in the HARQ buffer) or have data available that can be multiplexed (i.e., the data from the logical channels is going to be encapsulated to a potential MAC PDU which has not been stored in the HARQ buffer) in the MAC PDU, according to the mapping restrictions as described in clause 5.4.3.1.2. The priority of an UL grant for which no data for logical channels is multiplexed or can be multiplexed in the MAC PDU is lower than either the priority of an UL grant for which data for any logical channels is multiplexed or can be multiplexed in the MAC PDU or the priority of the logical channel triggering an SR.

With reference to FIG. 13, an embodiment of the disclosed method is detailed in the following.

Step A0: For each UL grant, the UE 10 checks whether at least one UL grant overlaps with one or more other UL grants. A UL grant may be a CG or a DG. Overlapping UL grants may comprise overlapping CG vs. CG, CG vs. DG, or DG vs. CG. For simplicity, the at least one UL grant that overlaps one or more UL grants is referred to as an overlapping UL grant, and the one or more UL grants are referred to as overlapping UL grants. The overlapping UL grants may comprise a DG, a CG, or a scheduling request (SR).

Step A1: If there is at least one overlapping UL grant, the UE 10 performs LCH prioritization for the overlapping UL grants if lch-basedPrioritization is configured. The UE 10 compares the LCH priority of (potential) MAC PDU(s) for each UL grant, selects the UL grant with the highest LCH priority, and then executes Step A2. The overlapping UL grant may be a UL grant already having a MAC PDU (assuming the highest LCH priority of the MAC PDU is n and use HID m) waiting for retransmission. Note that at this step, only LCH prioritization for the overlapping UL grants is performed, and the encapsulation of MAC PDU(s) for the selected UL grant will be performed in the subsequent step.

Step A2: The UE 10 checks whether the overlapping UL grant is configured with cg-RetransmissionTimer? If yes, the UE 10 executes Step A3. Otherwise, the UE 10 executes Step A7.

Step A3: If cg-RetransmissionTimer is configured (i.e., cg-RetransmissionTimer is configured by the gNB 20 through ConfiguredGrantConfig information element (IE)), the UE 10 selects an HID based on a transmission state (i.e., initial transmission or retransmission). The transmission state may be a transmission state associated with the overlapping UL grant and/or the MAC PDU in the overlapping UL grant, which represents a transmission of the overlapping UL grant and/or the MAC PDU is initial transmission or retransmission. If the transmission state is an initial transmission, the MAC entity 300 encapsulates the MAC PDU, delivers the MAC PDU and HARQ information of a transport block (TB) and UL grant to a HARQ process, and instructs the HARQ process to trigger a new transmission of the UL grant. Before the step, the MAC PDU has not been queued in the HARQ process n. The selected HID is other than the HID of the MAC PDU queued in the HARQ process n. Regarding the HARQ information, for example, with reference to TS38.321, HARQ information for DL-SCH, for UL-SCH, or for SL-SCH transmissions consists of New Data Indicator (NDI), Transport Block size (TBS), Redundancy Version (RV), and HARQ process ID. If the transmission state is retransmission, the UE 10 directly instructs the HARQ process to trigger a retransmission. Then the UE 10 executes Step A4.

The MAC entity 300 in the MAC layer supports the following functions:
mapping between logical channels and transport channels;
multiplexing of MAC SDUs from one or different logical channels onto transport blocks (TB) to be delivered to the physical layer on transport channels; and
demultiplexing of MAC SDUs to one or different logical channels from transport blocks (TB) delivered from the physical layer on transport channels.

The UL grant is filled up with a transport block (TB) which is generated from encapsulating a MAC PDU. Encapsulating the MAC PDU comprises multiplexing and assembling the MAC SDU(s) from the logical channel(s). The MAC entity 300 packages one or more MAC SDUs with a MAC header into a MAC PDU according to the size (i.e., transport block size, TBS) of the UL grant, and then the MAC entity 300 will send this MAC PDU to the HARQ entity 310. The HARQ entity 310 transforms the MAC PDU to the transport block by adding the HARQ information (e.g., NDI, RV, HARQ process ID, etc.) to the MAC PDU.

Step A4: Before the transmission, the UE 10 checks whether an LBT failure indication is received from the lower layer. If yes, the UE 10 executes Step A6. Otherwise, the UE 10 executes Step A5.

Step A5: If no LBT failure indication is received from the lower layer, the UE 10 transmits the MAC PDU. Note that when the UE 10 successfully transmits the MAC PDU, configuredGrantTimer and cg-RetransmissionTimer will be started or restarted.

Step A6: If an LBT failure indication is received from the lower layer, the UE 10 stops the MAC PDU transmission and saves (i.e., queues or buffers) the MAC PDU in the HARQ entity 310 to wait for retransmission on a subsequent UL grant. The MAC PDU is referred to as a pending MAC PDU. Then execution of the method goes back to Step A0.

The HARQ entity 310 of the UE 10 may indicate the transmission state to MAC entity of the UE 10 such that the UE 10 can save the LCH priority of the MAC PDU and compare the LCH priority of the MAC PDU with the LCH priority of the potential MAC PDU for the other subsequent UL grants.]

The MAC entity 300 determines whether an LBT failure indication is sent from a lower layer of the MAC entity of the UE. Note that when an LBT failure indication is received from the lower layer, the UL grant can be a deprioritized grant. If the MAC PDU transmission is initiated (i.e., configuredGrantTimer is started or restarted) and then be stopped or canceled because of LBT failure, the configuredGrantTimer is stopped. When the MAC PDU transmission is stopped or canceled because of LBT failure, the cg-RetransmissionTimer will not be started or restarted and the state of the HARQ process is pending.

Step A7: If cg-RetransmissionTimer is not configured, the UE 10 further checks whether the UL grant is configured with autonomousTX? If yes, the UE 10 executes Step A8. Otherwise, the UE 10 executes Step A9.

Step A8: If autonomousTX is configured, the MAC entity 300 encapsulates the MAC PDU and delivers the MAC PDU and HARQ information of a TB and the UL grant to the HARQ process with an HID selected based on the formula 2. Then the UE 10 executes Step A4.

HARQ Process ID=[floor(CURRENT_symbol/periodicity)]modulo nrofHARQ-Processes+harq-ProcID-Offset2   Formula 2 where CURRENT_symbol=(SFN×numberOfSlotsPerFrame×numberOfSymbolsPerSlot+slot number in the frame×numberOfSymbolsPerSlot+symbol number in the slot);
numberOfSlotsPerFrame refers to the number of consecutive slots per frame;
numberOfSymbolsPerSlot refers to the number of consecutive symbols per slot;
nrofHARQ-Processes is defined in the 3GPP related standards; and
harq-ProcID-Offset2 is defined in the 3GPP related standards.

Step A9: If autonomousTX is not configured, the UE 10 encapsulates the MAC PDU and delivers the MAC PDU and the UL grant and HARQ information of a TB to the HARQ process with an HID based on the formula 1. Then the UE 10 executes Step A4.

HARQ Process ID=[floor(CURRENT_symbol/periodicity)]modulo nrofHARQ-Processes   Formula 1

Step A10: If there are no overlapping UL grants, the UE 10 encapsulates a new MAC PDU and delivers the MAC PDU and the UL grant and HARQ information of a TB to the HARQ process with an HID based on the formula 1. Then the UE 10 executes Step A4.

Embodiment 3.a

In this embodiment, the UE 10 performs autonomous transmission based on autonomousTX when a CG is deprioritized, or performs autonomous retransmission based on cg-RetransmissionTimer when the CG encounters LBT failure. There are two sub-scenarios for the deprioritized CG. In a first sub-scenario, LCH prioritization for the overlapping CG grants is performed before the MAC PDU encapsulation such that only one MAC PDU is transmitted on the prioritized grant. In this case, the MAC PDU for the deprioritized CG is not encapsulated and there is no MAC PDU waiting for transmission in the HARQ entity 310 of the deprioritized CG. (i.e., step B9 in FIG. 14) In a second sub-scenario, LCH prioritization for the overlapping CG grants is performed after encapsulation of a first MAC PDU (or the MAC PDU waiting for retransmission) (i.e., Step B3 or Step B8 in FIG. 14) such that a second MAC PDU (with high priority) preempts the transmission of the first MAC PDU. In the second sub-scenario, the (first) MAC PDU for a deprioritized CG is already encapsulated and will be queued in the HARQ entity 310 of the deprioritized CG waiting for retransmission. In the first sub-scenario, the MAC PDU for the deprioritized CG is not encapsulated at all and the MAC entity 300 can schedule data from a deprioritized LCH of the deprioritized CG when the MAC entity 300 obtains any subsequent UL grant, and the URLLC rule or the NR-U rule is applicable. In the second sub-scenario, the MAC PDU for the deprioritized CG is already encapsulated and will block the subsequent MAC PDU from the (same) LCH of the deprioritized CG if the MAC PDU cannot be transmitted as early as possible, and therefore NR-U rule is more applicable for this case. That is why the autonomous retransmission in Step B3 is before the autonomous transmission in Step B8. In one implementation of this embodiment, the MAC PDU for the selected UL grant is encapsulated and delivered to the HARQ entity, and the HARQ entity of the UE should check the LBT failure indication from the lower layer before transmitting the MAC PDU. In another implementation of this embodiment, the MAC PDU for the selected UL grant is encapsulated and buffered in the buffer of the MAC entity, and the MAC entity of the UE should check the LBT failure indication from the lower layer before transmitting the MAC PDU to the HARQ entity. No matter which implementation is used, the MAC PDU is encapsulated first and then waiting for the LBT failure indication such that the configuredGrantTimer and the cg-RetransmissionTimer for the selected UL grant will be started.

Figure 14:
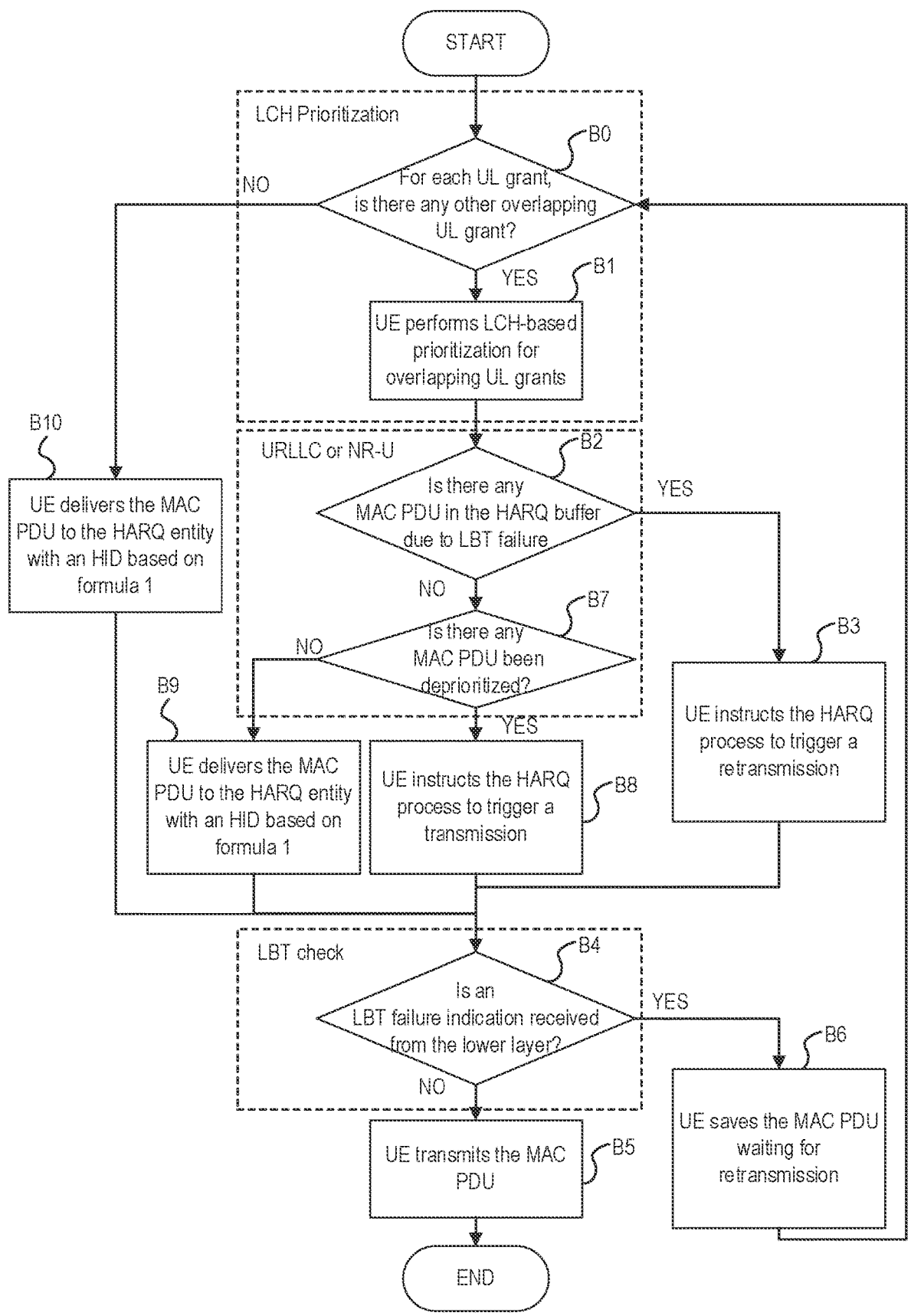
FIG. 14 illustrates a schematic view showing UE operation when configured with lch-based Prioritization, autonomousTX, and cg-RetransmissionTimer according to another embodiment of the disclosure.

With reference to FIG. 14, an embodiment of the disclosed method is detailed in the following.

Step B0: For each UL grant (or transmission opportunity) received by the UE 10, the UE 10 checks whether there is an overlapping UL grant.

Step B1: If there is at least one UL grant overlapping with a received UL grant, the UE 10 performs LCH prioritization for the overlapping UL grants if lch-basedPrioritization is configured. The UE 10 compares the LCH priority of (potential) MAC PDU(s) for each UL grant, selects a (potential) MAC PDU for the UL grant with the highest LCH priority, and then executes Step B2. The UL grant, selected by the UE, with the highest LCH priority among to-be-transmitted MAC PDU(s) and/or potential MAC PDU(s) is a prioritized UL grant. Note that This is different from the rule of NR-U in that the retransmitted MAC PDU is always prioritized. A UL grant may be deprioritized through the LCH prioritization. If there is any MAC PDU (referred to as a pending MAC PDU) in the deprioritized UL grant, the UE 10 will process the MAC PDU in the deprioritized UL grant.

Step B2: The UE 10 checks for the prioritized UL grant whether there is any MAC PDU with the prioritized UL grant in the HARQ process waiting for (re)transmission due to LBT failure by checking a state of the HARQ process (e.g., determining whether the HARQ process is pending)? If yes, the UE 10 executes Step B3. Otherwise, the UE 10 executes Step B7.

Step B3: If there is a MAC PDU (referred to as a pending MAC PDU) in the HARQ buffer and the HARQ process is pending, the UE 10 directly instructs the HARQ process to trigger a retransmission of the pending MAC PDU using the same HID. The MAC PDU is referred to as a pending MAC PDU. The HID of the HARQ process may be used on the different CG(s) if the cg-RetransmissionTimer is configured. Then the UE 10 executes Step B4. Note that in this case, the cg-RetransmissionTimer should be configured for the CG (i.e., the prioritized UL grant) by the gNB 20.

In this case, the LCH priority of the pending MAC PDU should be the highest priority among the potential MAC PDU for the other overlapping UL grants. When a MAC PDU with the prioritized UL grant encounters LBT failure and is deprioritized before, the UE 10 should follow the rule of NR-U to deal with the MAC PDU (i.e., the MAC PDU may be transmitted on different CGs.) The UE 10 retransmits the MAC PDU after the cg-RetransmissionTimer expires. In this case, at least cg-RetransmissionTimer is configured for the CG (i.e., the prioritized UL grant. (i.e., autonomousTX may be or may be not configured for the CG.) If the HARQ process for the existing MAC PDU (e.g., the pending MAC PDU) is pending, which means the MAC PDU has not been transmitted before, (i.e., the configuredGrantTimer is not started) the UE 10 should perform autonomous retransmission for the MAC PDU on the next CG opportunity. (i.e., the next CG opportunity may be on the same CG configuration or on the different CG configuration(s). In this case, the gNB 20 is not aware of the pending MAC PDU and cannot schedule a dynamic grant for the MAC PDU. If the HARQ process for the existing MAC PDU is not pending, which means the MAC PDU has already been transmitted before, (i.e., the configuredGrantTimer is started and keeps running) the UE 10 could perform autonomous retransmission for the MAC PDU on the next CG opportunity or transmits the MAC PDU on a dynamic grant scheduled by the gNB 20.

Step B4: Before the transmission, the UE 10 checks whether an LBT failure indication is received from the lower layer. If yes, the UE 10 executes Step B6. Otherwise, the UE 10 executes Step B5.

Step B5: If no LBT failure indication is received from the lower layer, the UE 10 transmits the MAC PDU.

Step B6: If a LBT failure indication is received from the lower layer, the UE 10 stops the MAC PDU transmission and saves the MAC PDU (referred to as a pending MAC PDU) in the HARQ entity 310 to wait for retransmission on a subsequent UL grant. Then execution of the method goes back to Step B0.

If the MAC PDU transmission is initiated (i.e., configuredGrantTimer is started or restarted) and then be stopped or canceled because of LBT failure, the configuredGrantTimer is stopped. When the MAC PDU transmission is stopped or canceled because of LBT failure, the cg-RetransmissionTimer will not be started or restarted and the state of the HARQ process is pending.

Step B7: The UE 10 further checks whether there is any deprioritized UL grant with a MAC PDU pending in a HARQ buffer of a HARQ process? If yes, the UE 10 executes Step B8. Otherwise, the UE 10 executes Step B9.

Step B8: If the UL grant with a MAC PDU is a deprioritized UL grant, the UE 10 directly instructs the HARQ process to trigger a transmission of the pending MAC PDU using the same HID. Then the UE 10 executes Step B4.

Note that in this case, autonomousTX should be configured for the CG by the gNB 20. Note that in this case, at least autonomousTX is configured for the CG. (i.e., cg-RetransmissionTimer may be not configured for the CG.) The state of the existing MAC PDU is changed by the MAC entity 300 from deprioritized to prioritized. If the MAC PDU is not transmitted before, the UE 10 should perform autonomous transmission for the MAC PDU on the next CG opportunity. (i.e., the next CG opportunity shall be on the same CG.) In this case, the gNB 20 is not aware of the deprioritized MAC PDU and cannot schedule a dynamic grant for the MAC PDU. If the MAC PDU is already transmitted before, the UE 10 should transmit the MAC PDU on the dynamic grant scheduled by the gNB 20. In this case, the gNB 20 is aware of the deprioritized MAC PDU and will schedule a dynamic grant for the MAC PDU.

Step B9: If there is no MAC PDU waiting for transmission in the UL grant, the UE 10 encapsulates a new MAC PDU and delivers the MAC PDU and the UL grant and HARQ information of aTB to the HARQ process with an HID based on the formula 1. Then the UE 10 executes Step B4.

Step B10: If there are no overlapping UL grants, the UE 10 encapsulates a new MAC PDU and delivers the MAC PDU and the UL grant and HARQ information of a TB to the HARQ process with an HID based on formula 1. Then the UE 10 executes Step B4.

Embodiment 3.b

In this embodiment, the UE 10 performs autonomous transmission based on autonomousTX when the CG is deprioritized, or performs autonomous retransmission based on cg-RetransmissionTimer when the CG encounters LBT failure. In this embodiment, LCH prioritization for the overlapping CG grants is performed after the MAC PDU(s) encapsulation such that only one MAC PDU can be encapsulated for each CG. In this embodiment, the MAC PDU is encapsulated after confirming no LBT failure indication is received for the UL grant. When the LBT failure indication is received, no new MAC PDU will be encapsulated such that the configuredGrantTimer and the cg-RetransmissionTimer for the selected UL grant will not be started. This embodiment can prevent the MAC entity of the UE from encapsulating a MAC PDU that cannot be transmitted.

Figure 15:
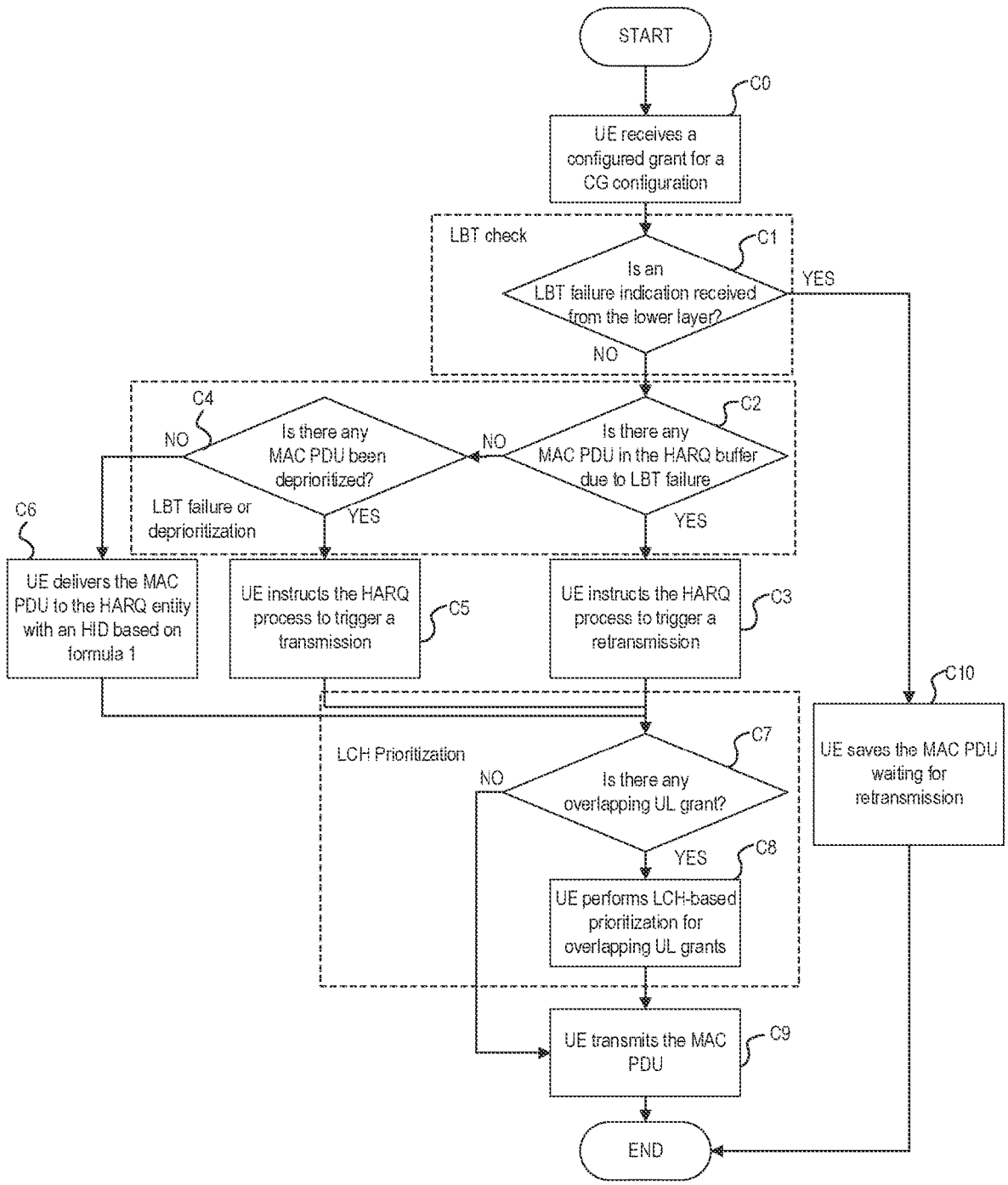
FIG. 15 illustrates a schematic view showing UE operation when configured with lch-basedPrioritization, autonomousTX, and cg-RetransmissionTimer though multiple CGs according to another embodiment of the disclosure.

With reference to FIG. 15, an embodiment of the disclosed method is detailed in the following.

Step C0: For a CG configuration, the UE 10 receives a UL grant from the lower layer. The UL grants for CG configurations may overlap in time. That is, the received UL grant for the CG configuration may overlap one or more other UL grants in time.

Step C1: For the received UL grant, the UE 10 checks whether an LBT failure indication is received from the lower layer. If yes, the UE 10 executes Step C10. Otherwise, the UE 10 executes Step C2.

Step C2: For the received UL grant, the UE 10 checks whether there is any MAC PDU (referred to as a pending MAC PDU) in a HARQ process waiting for retransmission due to previous LBT failure by checking the status of the HARQ process (e.g., determining whether the HARQ process is pending)? If yes, the UE 10 executes Step C3. Otherwise, the UE 10 executes Step C4.

Step C3: For the received UL grant, if there is a MAC PDU (referred to as a pending MAC PDU) in a HARQ buffer of the HARQ process and the HARQ process is pending, and if there is no new data with higher priority waiting for transmission, the UE 10 directly instructs the HARQ process to trigger a retransmission of the MAC PDU. The HID of the HARQ process may be used on different CG configuration(s) if the cg-RetransmissionTimer is configured. Then the UE 10 executes Step C7.

Note that in this case, the cg-RetransmissionTimer is configured for the CG by the gNB 20. In this case, the LCH priority of the pending MAC PDU should be the highest priority among the potential MAC PDU for the other overlapping UL grant. When a MAC PDU with the prioritized UL grant encounters LBT failure and is deprioritized before, the UE 10 should follow the rule of NR-U to process the MAC PDU (i.e., the MAC PDU may be transmitted on the different CG.)

If there is new data with higher priority waiting for transmission on the CG and lch-BasedPrioritization-r17 is configured, the UE 10 encapsulates a new MAC PDU for the new data and delivers the MAC PDU to the HARQ entity 310. The existing MAC PDU (e.g., the pending MAC PDU) may be dropped or be deprioritized. (i.e., retransmission is not always prioritized before initial transmission) If lch-BasedPrioritization-r17 is not configured, the UE 10 follows the NR-U rule that retransmission is always prioritized before initial transmission.

Step C4: The UE 10 further checks whether there is MAC PDU (referred to as a pending MAC PDU) in the HARQ process waiting for transmission due to being deprioritized previously? If yes, the UE 10 executes Step C5. Otherwise, the UE 10 executes Step C6.

Step C5: For the received UL grant, if there is a MAC PDU (referred to as a pending MAC PDU) in the HARQ buffer and if there is no new data with higher priority waiting for transmission, the UE 10 directly instructs the HARQ process to trigger a transmission of the pending MAC PDU using the same HID of the HARQ process. Then the UE 10 executes Step C7.

The parameter autonomousTX is configured for the CG by the gNB 20. If there is new data with higher priority waiting for transmission on the CG, UE 10 encapsulates a new MAC PDU for the new data and delivers the MAC PDU to the HARQ entity 310. The existing MAC PDU (e.g., the pending MAC PDU) may be dropped or be deprioritized.

Step C6: If there is no MAC PDU waiting for (re) transmission in the UL grant, the UE 10 encapsulates a new MAC PDU and delivers the MAC PDU and the UL grant and HARQ information of a TB to the HARQ process with an HID based on the formula 1. Then the UE 10 executes Step C7.

Step C7: For the received UL grant, the UE 10 checks whether there is an overlapping UL grant on other CG configurations. If yes, the UE 10 executes Step C8. Otherwise, the UE 10 executes Step C9.

Step C8: If there is at least one overlapping UL grant, the UE 10 performs LCH prioritization for the overlapping UL grants if lch-basedPrioritization is configured. The UE 10 compares the LCH priority of the (potential) MAC PDUs for the overlapping UL grants and selects the UL grant with the highest LCH priority, and then executes Step C9.

Step C9: The UE 10 transmits the MAC PDU.

Step C10: If an LBT failure indication is received from the lower layer, the UE 10 saves the MAC PDU in (referred to as a pending MAC PDU) the HARQ entity 310 to wait for retransmission on a subsequent UL grant. The state of the HARQ process is set as pending. For example, the MAC entity 300 sets the state and notifies the HARQ entity 310. Or, the HARQ entity 310 sets the state and notifies the MAC entity 300. The configuredGrantTimer and the cg-RetransmissionTimer for the CG are not started.

Note that if there is an existing MAC PDU (referred to as a pending MAC PDU) in the HARQ buffer and the HARQ process is pending (i.e., the HARQ process is pending since the previous CG opportunity), the UE 10 does not encapsulate a new MAC PDU for the CG.

If the MAC PDU transmission is initiated (i.e., configuredGrantTimer is started or restarted) and then be stopped or canceled because of LBT failure, the configuredGrantTimer is stopped. Since the MAC PDU is transmitted (but not finished), the state of the HARQ process is set as not pending.

When the MAC PDU transmission is stopped or canceled because of LBT failure, the cg-RetransmissionTimer will not be started or restarted and the state of the HARQ process is pending.

Embodiment 3.c

The embodiment 3c is similar to the embodiment 3b with the difference that only one CG is configured in this embodiment where multiple logical channels with different priorities may be configured in one CG. When the URLLC traffic is non-deterministic, it is more efficient to allow to schedule DG and CG on time-overlapping resources or allow to schedule enhanced mobile broadband (eMBB) and URLLC traffic in one CG. Therefore, LCH prioritization within one CG needs to be considered. The benefit of this embodiment is that the UE 10 does not need to implement multiple CGs and the implementation complexity can be reduced. In this embodiment, the MAC PDU is encapsulated after confirming no LBT failure indication is received for the UL grant. When the LBT failure indication is received, no new MAC PDU will be encapsulated such that the configuredGrantTimer and the cg-RetransmissionTimer for the selected UL grant will not be started. This embodiment can prevent the MAC entity of the UE from encapsulating a MAC PDU that cannot be transmitted.

Figure 16:
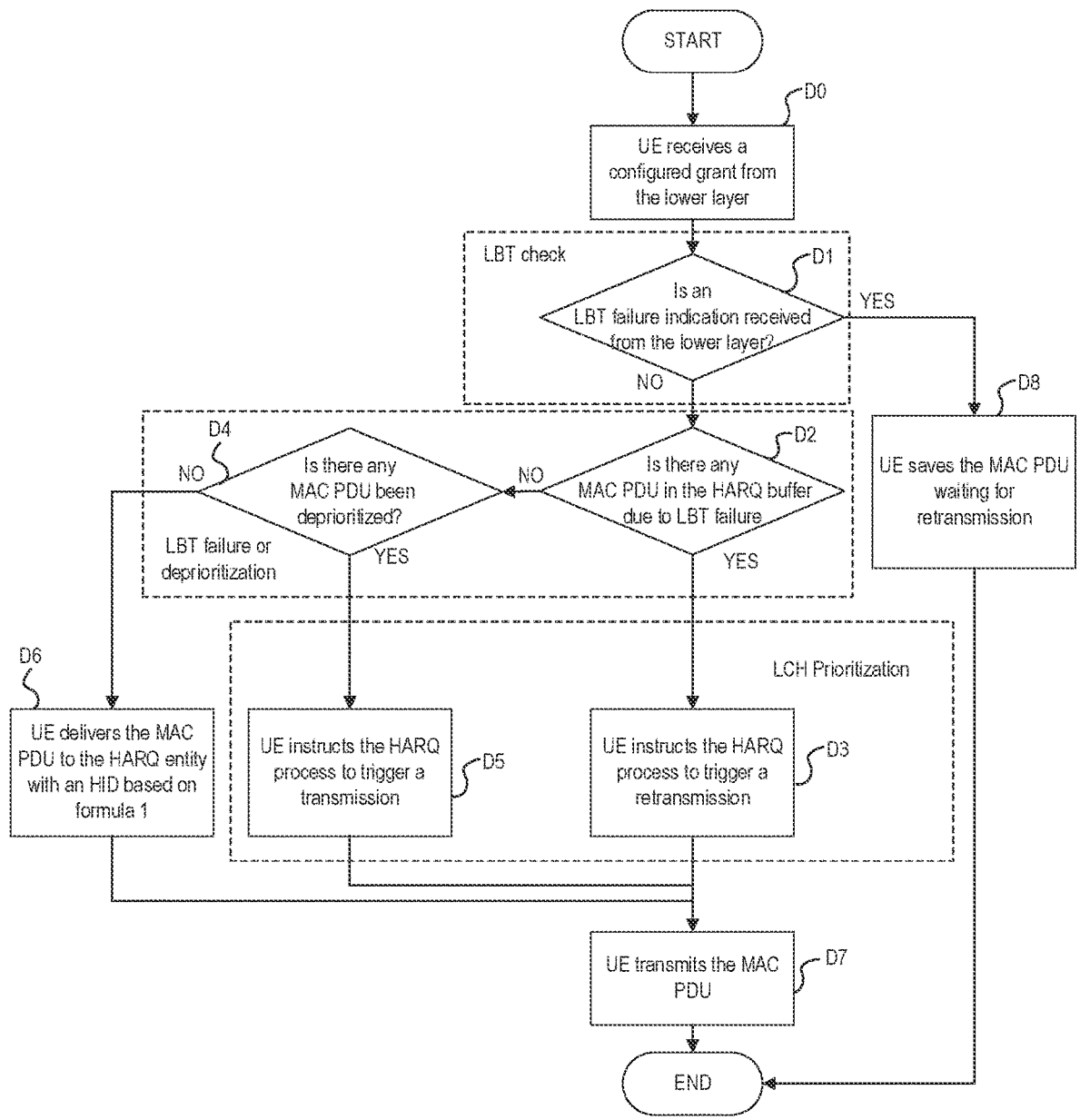
FIG. 16 illustrates a schematic view showing UE operation when configured with lch-basedPrioritization, autonomousTX, and cg-RetransmissionTimer through one single CG according to another embodiment of the disclosure.

With reference to FIG. 16, an embodiment of the disclosed method is detailed in the following.

Step D0: For a configured CG configuration, the UE 10 receives an UL grant from the lower layer.

Step D1: For the received UL grant, the UE 10 checks whether an LBT failure indication is received from the lower layer. If yes, the UE 10 executes Step D8. Otherwise, the UE 10 executes Step D2.

Step D2: For the received UL grant, the UE 10 checks whether there is any MAC PDU (referred to as a pending MAC PDU) in a HARQ process waiting for retransmission due to previous LBT failure by checking a status of the HARQ process (e.g., determining whether the HARQ process is pending)? If yes, the UE 10 executes Step D3. Otherwise, the UE 10 executes Step D4.

Step D3: For the received UL grant, if there is a MAC PDU (referred to as a pending MAC PDU) in the HARQ buffer and the HARQ process is pending, and if there is no new data with higher priority waiting for transmission, the UE 10 directly instructs the HARQ process to trigger a retransmission of the pending MAC PDU. Then the UE 10 executes Step D7.

Note that the parameter cg-RetransmissionTimer is configured for the CG by the gNB 20. In this case, the LCH priority of the pending MAC PDU should be the highest priority among the potential MAC PDUs for the other overlapping UL grants. If there is new data with higher priority waiting for transmission on the UL grants and lch-BasedPrioritization-r17 is configured, the UE 10 encapsulates a new MAC PDU for the new data and delivers the MAC PDU to the HARQ entity 310. The existing MAC PDU (e.g., the pending MAC PDU) may be dropped or be deprioritized. (i.e., retransmission is not always prioritized before initial transmission) If lch-BasedPrioritization-r17 is not configured, the UE 10 follows the NR-U rule that retransmission is always prioritized before initial transmission.

Step D4: The UE 10 further checks whether there is MAC PDU (referred to as a pending MAC PDU) in the HARQ process waiting for transmission due to being deprioritized previously? If yes, the UE 10 executes Step D5. Otherwise, the UE 10 executes Step D6.

Step D5: For the received UL grant, if there is a MAC PDU (referred to as a pending MAC PDU) in the HARQ buffer and if there is no new data with higher priority waiting for transmission, the UE 10 directly instructs the HARQ process to trigger a transmission of the pending MAC PDU using the same HID of the HARQ process. Then the UE 10 executes Step D7.

Note that the parameter autonomousTX is configured for the CG by the gNB 20.

If there is new data with higher priority waiting for transmission on the CG, the UE 10 encapsulates a new MAC PDU for the new data and delivers the MAC PDU to the HARQ entity 310. The existing MAC PDU (e.g., the pending MAC PDU) may be dropped or be deprioritized.

Step D6: If there is no MAC PDU waiting for (re)transmission in the UL grant, the UE 10 encapsulates a new MAC PDU and delivers the MAC PDU and the UL grant and HARQ information of a TB to the HARQ process with an HID based on the formula 1. Then the UE 10 executes Step D7.

Step D7: The UE 10 transmits the MAC PDU.

Step D8: If an LBT failure indication is received from the lower layer, the UE 10 saves the MAC PDU in the HARQ entity 310 to wait for retransmission on a subsequent UL grant. The state of the HARQ process is set as pending. The configuredGrantTimer and the cg-RetransmissionTimer for the CG are not started.

Note that if there is an existing MAC PDU (referred to as a pending MAC PDU) in the HARQ buffer and the HARQ process is pending (i.e., the HARQ process is pending since the previous CG opportunity), the UE 10 does not encapsulate a new MAC PDU for the CG.

If the MAC PDU transmission is initiated (i.e., configuredGrantTimer is started or restarted) and then be stopped or cancelled because of LBT failure, the configuredGrantTimer is stopped. Since the MAC PDU is transmitted (but not finished), the state of the HARQ process is set as not pending.

When the MAC PDU transmission is stopped or cancelled because of LBT failure, the cg-RetransmissionTimer will not be started or restarted and the state of the HARQ process is pending.

Embodiment 4: Network Configures UE with lch-basedPrioritization and cg-RetransmissionTimer to Enable the LCH Prioritization on Licensed Spectrum or UCE In this embodiment, only lch-basedPrioritization and cg-RetransmissionTimer is configured for the UE 10. When the cg-RetransmissionTimer is configured as one CG periodicity, the deprioritized MAC PDU may be retransmitted on the next CG opportunity (i.e., the cg-RetransmissionTimer expires before the next CG opportunity), and the behavior of the UE 10 is similar as when autonomousTX is configured. The benefit of this embodiment is that only the features of LCH prioritization and NR-U based retransmission (i.e., NR-U based retransmission is used as a substitute for URLLC based retransmission) are implemented in the UE 10, and the implementation complexity can be reduced.

Figure 17:
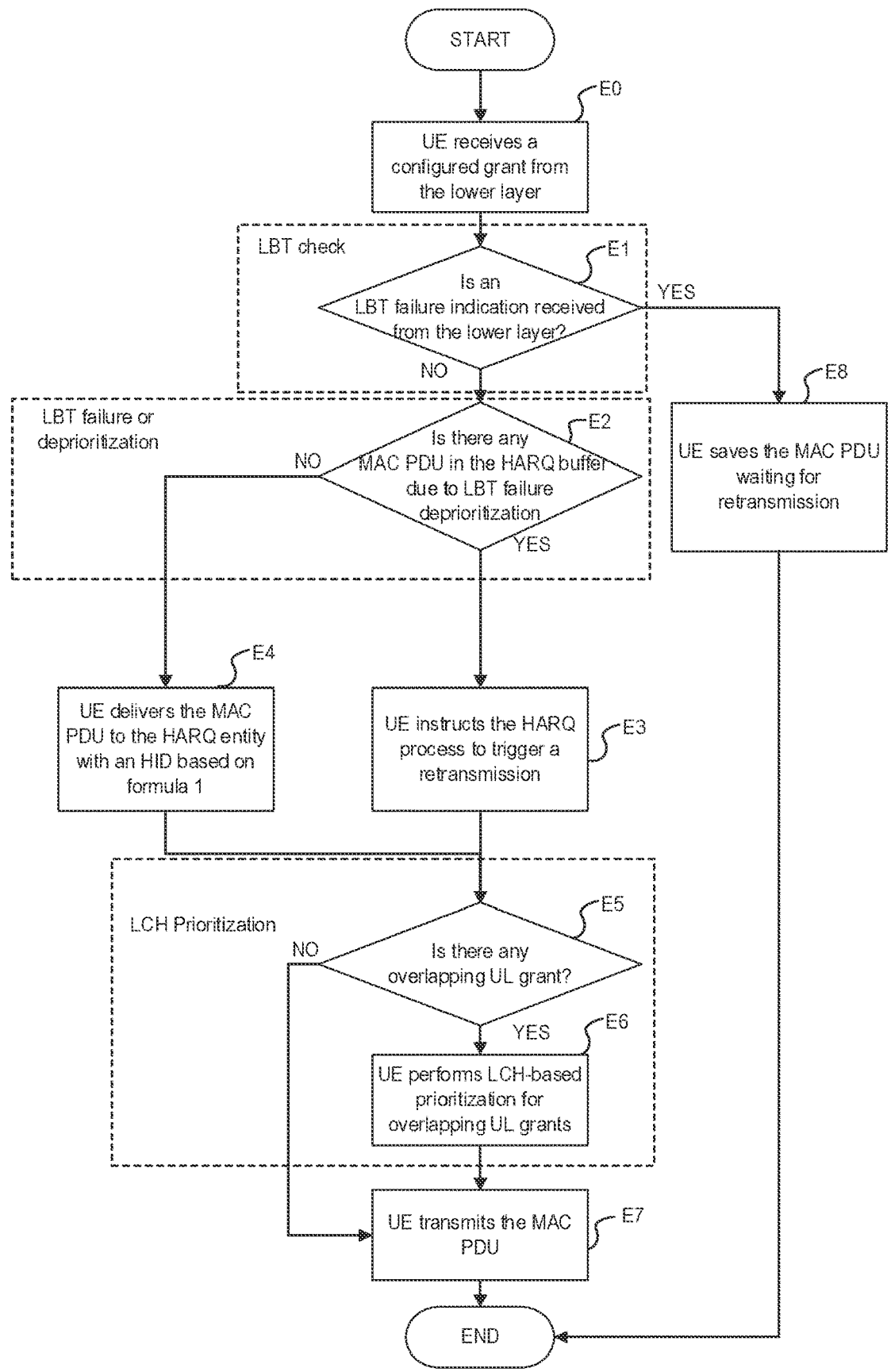
FIG. 17 illustrates a schematic view showing UE operation when configured with lch-basedPrioritization and cg-RetransmissionTimer according to another embodiment of the disclosure.

With reference to FIG. 17, an embodiment of the disclosed method is detailed in the following.

Step E0: For a CG configuration, the UE 10 receives a UL grant from the lower layer. UL grants for CG configurations may overlap in time. That is, the received UL grant for the CG configuration may overlap one or more other UL grants in time.

Step E1: For the received UL grant, the UE 10 checks whether an LBT failure indication is received from the lower layer. If yes, the UE 10 executes Step E8. Otherwise, the UE 10 executes Step E2.

Step E2: For the received UL grant, the UE 10 checks whether there is any MAC PDU (referred to as a pending MAC PDU) in a HARQ process waiting for retransmission due to previous LBT failure by checking a state of the HARQ process (e.g., determining whether HARQ process is pending), or whether there is any MAC PDU (referred to as a pending MAC PDU) in the HARQ process waiting for transmission due to deprioritization? If yes, the UE 10 executes Step E3. Otherwise, the UE 10 executes Step E4.

Step E3: For the received UL grant, if there is a MAC PDU (referred to as a pending MAC PDU) in the HARQ buffer and the HARQ process is pending, and if there is no new data with higher priority waiting for transmission, the UE 10 directly instructs the HARQ process to trigger a retransmission of the pending MAC PDU. The HID of the HARQ process may be used on different CG configuration(s) if the cg-RetransmissionTimer is started. Then the UE 10 executes Step E5.

Note that cg-RetransmissionTimer is configured for the CG by the gNB 20. In this case, the LCH priority of the pending MAC PDU should be the highest priority among the potential MAC PDU for the other overlapping UL grant. If there is new data with higher priority waiting for transmission on the CG and lch-BasedPrioritization-r17 is configured, the UE 10 encapsulates a new MAC PDU for the new data and delivers the MAC PDU to the HARQ entity 310. The existing MAC PDU (e.g., the pending MAC PDU) may be dropped or be deprioritized. (i.e., retransmission is not always prioritized before initial transmission) If lch-BasedPrioritization-r17 is not configured, the UE 10 follows the NR-U rule that retransmission is always prioritized before initial transmission.

Step E4: If there is no MAC PDU (i.e., the pending MAC PDU) waiting for (re)transmission in the UL grant, the UE 10 encapsulates a new MAC PDU and delivers the MAC PDU and the UL grant and the HARQ information of a TB to the HARQ process with an HID based on the formula 1. Then the UE 10 executes Step E5.

Step E5: For the received UL grant, the UE 10 checks whether there is an overlapping UL grant on other CG(s), which overlaps the received UL grant. If yes, the UE 10 executes Step E6. Otherwise, the UE 10 executes Step E7.

Step E6: If there is at least one overlapping UL grant, the UE 10 performs LCH prioritization for the overlapping UL grants if lch-basedPrioritization is configured. The UE 10 compares the LCH priority of the (potential) MAC PDUs for the overlapping UL grants, and selects a MAC PDU for the UL grant with the highest LCH priority, and then executes Step E7.

Step E7: The UE 10 transmits the MAC PDU.

Step E8: If an LBT failure indication is received from the lower layer, the UE 10 saves the MAC PDU in the HARQ entity 310 to wait for retransmission on a subsequent UL grant. The state of the HARQ process is set as pending. The configuredGrantTimer and the cg-RetransmissionTimer for the CG are not started.

Note that if there is an existing MAC PDU (referred to as a pending MAC PDU) in the HARQ buffer and the HARQ process is pending (i.e., the HARQ process is pending since the previous CG opportunity), the UE 10 does not encapsulate a new MAC PDU for the CG.

If the MAC PDU transmission is initiated (i.e., configuredGrantTimer is started or restarted) and then be stopped or canceled because of LBT failure, the configuredGrantTimer is stopped. Since the MAC PDU is transmitted (but not finished), the state of the HARQ process is set as not pending.

When the MAC PDU transmission is stopped or canceled because of LBT failure, the cg-RetransmissionTimer will not be started or restarted, and the state of the HARQ process is pending.

Figure 18:
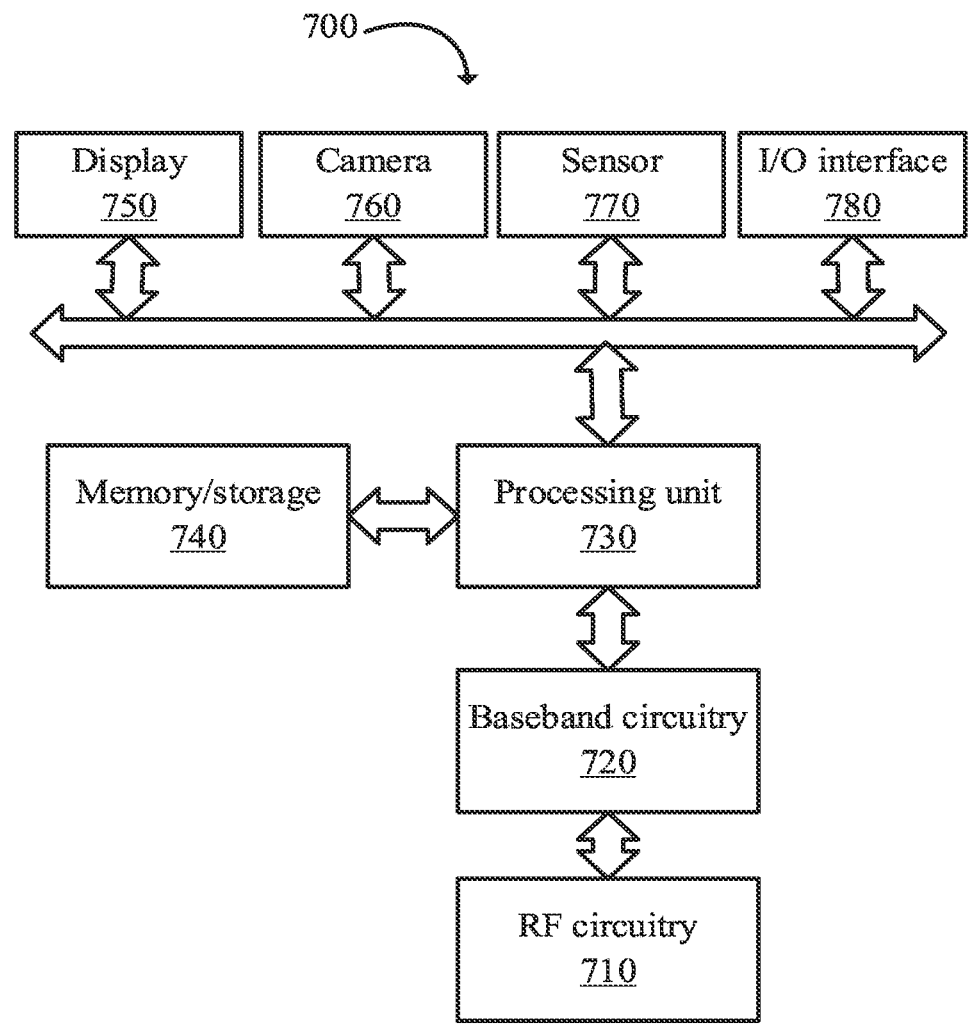
FIG. 18 illustrates a schematic view showing a system for wireless communication according to an embodiment of the present disclosure.

FIG. 18 is a block diagram of an example system 700 for wireless communication according to an embodiment of the present disclosure. Embodiments described herein may be implemented into the system using any suitably configured hardware and/or software. FIG. 18 illustrates the system 700 including a radio frequency (RF) circuitry 710, a baseband circuitry 720, a processing unit 730, a memory/storage 740, a display 750, a camera 760, a sensor 770, and an input/output (I/O) interface 780, coupled with each other as illustrated.

The processing unit 730 may include circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with 5G NR, LTE, an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitries, the baseband circuitry, and/or the processing unit. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the processing unit, and/or the memory/storage may be implemented together on a system on a chip (SOC).

The memory/storage 740 may be used to load and store data and/or instructions, for example, for the system. The memory/storage for one embodiment may include any combination of suitable volatile memory, such as dynamic random access memory (DRAM), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an Ultrabook, a smartphone, etc. In various embodiments, the system may have more or less components, and/or different architectures. Where appropriate, the methods described herein may be implemented as a computer program. The computer program may be stored on a storage medium, such as a non-transitory storage medium.

The embodiment of the present disclosure is a combination of techniques/processes that may be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of the application and design requirement for a technical plan. A person having ordinary skill in the art may use different ways to realize the function for each specific application while such realizations should not go beyond the scope of the present disclosure. It is understood by a person having ordinary skill in the art that he/she may refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure may be realized in other ways. The above-mentioned embodiments are exemplary only. The division of the units is merely based on logical functions while other divisions exist in realization. It is possible that a plurality of units or components are combined or integrated into another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments may be integrated into one processing unit, physically independent, or integrated into one processing unit with two or more than two units.

If the software function unit is realized and used and sold as a product, it may be stored in a readable storage medium in a computer. Based on this understanding, the technical plan proposed by the present disclosure may be essentially or partially realized as the form of a software product. Or, one part of the technical plan beneficial to the conventional technology may be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

For Rel-17 IIoT/URLLC services and communication, regarding whether autonomous retransmission/transmission is performed on the same or on different CG configuration, embodiments of the disclosure provide the following solutions:

For Rel-17 IIoT/URLLC, on licensed spectrum or UCE, Rel-16 autonomous transmission (e.g., autonomousTX) can be reused such that autonomous transmission is performed on the same CG configuration. To ensure the QoS for the URLLC LCH, the deprioritized MAC PDU should be able to be transmitted as early as possible. As described in embodiment 1, the deprioritized MAC PDU should be able to be transmitted on different CG configuration(s) if the CG(s) is configured with the same or larger Transport Block Size (TBS) and with the same or higher reliability.

For Rel-17 IIoT/URLLC on unlicensed spectrum, Rel-16 NR-U and LCH based prioritization can be used such that autonomous retransmission can be performed on different CG configuration(s) if the CGs are configured with the same or larger TBS and with the same or higher reliability. As described in embodiment 2, if LBT failure and/or UL grant deprioritization happen continuously, the gNB 20 may schedule the dynamic grant with an HID other than the set of HIDs for CGs such that the collision of HID will not happen.

For Rel-17 IIoT/URLLC services and communication, which one of retransmission of a MAC PDU or transmission of a MAC PDU with the highest LCH priority should be prioritized, embodiments of the disclosure provide the following solutions:

For Rel-17 IIoT/URLLC on a licensed spectrum or UCE, Rel-16 LCH based prioritization and/or autonomousTX can be reused such that a MAC PDU with the highest LCH is prioritized. To ensure the quality of service (QoS) for the URLLC LCH, the deprioritized MAC PDU should be able to be transmitted as early as possible. As described in embodiment 1, the deprioritized MAC PDU could be transmitted on different CG configuration if the CG is configured with the same or larger TBS and with the same or higher reliability.

For Rel-17 IIoT/URLLC on an unlicensed spectrum, Rel-17 LCH based prioritization and/or cg-Retransmission-Timer can be configured such that a MAC PDU with the highest LCH is prioritized. As described in embodiment 2, if LBT failure and/or UL grant deprioritization happen continuously, the gNB may schedule the dynamic grant with an HID other than the set of HIDs for CGs such that the collision of HID will not happen.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method for logical-channel-based prioritization for URLLC in unlicensed spectrum executable in a user equipment (UE), comprising:
a medium access control (MAC) entity determining whether a medium access control (MAC) protocol data unit (PDU) is buffered in a hybrid automatic repeat request (HARQ) buffer of a HARQ process as a pending MAC PDU and detecting a collision involving a plurality of uplink (UL) configured grants (CGs), in which a first UL configured grant in the plurality of UL configured grants is received by the UE and overlaps with a second UL configured grant in the plurality of UL configured grants, wherein the first UL configured grant is allocated for autonomous transmission of the pending MAC PDU in ultra-reliable and low latency communications (URLLC) over an unlicensed band, and the second UL configured grant is allocated for transmission of a MAC PDU indicated as new data in URLLC over the unlicensed band,
wherein the MAC entity performs LCH-based prioritization for the plurality of uplink configured grants received by the UE when a Rel-16 parameter cg-RetransmissionTimer is configured for each of the plurality of uplink configured grants and a Rel-17 LCH-based prioritization parameter included in an MAC cell group configuration information element (IE) MAC-CellGroupConfig is enabled for the MAC entity of the UE;
in the LCH-based prioritization:
the MAC entity prioritizing autonomous transmission of the pending MAC PDU through the first UL configured grant associated with a first HARQ process ID over transmission of the MAC PDU indicated as new data through the second UL configured grant associated with a second HARQ process ID when a logical channel (LCH) priority associated with the MAC PDU indicated as new data is not higher than an LCH priority associated with the pending MAC PDU; and
the MAC entity prioritizing transmission of the MAC PDU indicated as new data through the second UL configured grant associated with the second HARQ process ID over autonomous transmission of the pending MAC PDU through the first UL configured grant associated with the first HARQ process ID when the LCH priority associated with the MAC PDU indicated as new data is higher than the LCH priority associated with the pending MAC PDU.

2. The method of claim 1, wherein when the transmission of the MAC PDU indicated as new data through the second UL configured grant is prioritized over the autonomous transmission of the pending MAC PDU through the first UL configured grant, the pending MAC PDU is deprioritized by being queued in the HARQ buffer.

3. The method of claim 1, wherein when the transmission of the MAC PDU indicated as new data through the second UL configured grant is prioritized over the autonomous transmission of the pending MAC PDU through the first UL configured grant, the pending MAC PDU is dropped.

4. The method of claim 1, wherein the MAC entity determines a cause of pending the pending MAC PDU in the HARQ buffer of the HARQ process.

5. The method of claim 4, wherein when determining the cause of pending the pending MAC PDU in the HARQ buffer of the HARQ process is listen before talk (LBT) failure, the MAC entity performs the autonomous transmission of the pending MAC PDU according to a configured grant retransmission timer.

6. The method of claim 5, wherein the configured grant retransmission timer comprises a parameter cg-RetransmissionTimer.

7. The method of claim 4, wherein when determining the cause of pending the pending MAC PDU in the HARQ buffer of the HARQ process is that the pending MAC PDU has been deprioritized, the MAC entity performs the autonomous transmission of the pending MAC PDU according to an autonomous transmission indicator, and the autonomous transmission indicator comprises a parameter autonomousTX.

8. The method of claim 7, wherein the MAC entity stops the cg-RetransmissionTimer for the HARQ process of an uplink configured grant that has been deprioritized, wherein the uplink configured grant that has been deprioritized is one of the first UL configured grant or the second UL configured grant.

9. The method of claim 1, wherein the MAC entity determines whether an LBT failure indication is sent from a lower layer of the MAC entity of the UE.

10. The method of claim 9, wherein the MAC entity performs the determining as to whether an LBT failure indication is sent from the lower layer of the MAC entity of the UE before the determining as to whether a MAC PDU is buffered in the HARQ buffer of the HARQ process as the pending MAC PDU; or the MAC entity performs the determining as to whether an LBT failure indication is sent from the lower layer of the MAC entity of the UE after the determining as to whether a MAC PDU is buffered in the HARQ buffer of the HARQ process as the pending MAC PDU.

11. The method of claim 1, wherein the MAC entity performs the detecting of the collision before the determining as to whether a MAC PDU is buffered in the HARQ buffer of the HARQ process as the pending MAC PDU; or the MAC entity performs the detecting of the collision after the determining as to whether a MAC PDU is buffered in the HARQ buffer of the HARQ process as the pending MAC PDU.

12. The method of claim 1, wherein the MAC entity performs the LCH-based prioritization before the determining as to whether a MAC PDU is buffered in the HARQ buffer of the HARQ process as the pending MAC PDU; or the MAC entity performs the LCH-based prioritization after the determining as to whether a MAC PDU is buffered in the HARQ buffer of the HARQ process as the pending MAC PDU.

13. The method of claim 1, wherein the MAC entity performs determining as to whether a cause of pending the pending MAC PDU in the HARQ buffer of the HARQ process is listen before talk (LBT) failure before determining as to whether the cause of pending the pending MAC PDU in the HARQ buffer of the HARQ process is that the pending MAC PDU has been deprioritized.

14. The method of claim 1, wherein the MAC entity performs the autonomous transmission of the pending MAC PDU using a HARQ process identifier (HID) of the HARQ process, and the HID of the HARQ process is shared by different uplink configured grants.

15. A user equipment (UE) comprising:
a processor configured to call and run a computer program stored in a memory, to cause a device in which the processor is installed to execute a method of claim 1.

16. A chip, comprising:
a processor, configured to call and run a computer program stored in a memory, to cause a device in which the chip is installed to execute a method of claim 1.

17. A non-transitory computer-readable storage medium, in which a computer program is stored, wherein the computer program causes a computer to execute a method of claim 1.

18. A wireless communication method executable in a user equipment (UE), comprising:
a medium access control (MAC) entity determining whether a medium access control (MAC) protocol data unit (PDU) is buffered in a hybrid automatic repeat request (HARQ) buffer of a HARQ process as a pending MAC PDU and detecting a collision involving the pending MAC PDU and a MAC PDU indicated as new data, wherein the pending MAC PDU is for ultra-reliable and low latency communications (URLLC),
wherein the MAC entity performs LCH-based prioritization for a first uplink configured grant received by the UE when a Rel-16 parameter cg-RetransmissionTimer is configured for each of a plurality of uplink configured grants and a Rel-17 LCH-based prioritization parameter included in an MAC cell group configuration information element (IE) MAC-CellGroupConfig is enabled for the MAC entity of the UE;

in the LCH-based prioritization:
the MAC entity prioritizing autonomous transmission of the pending MAC PDU through the first uplink configured grant associated with a first HARQ process ID on an unlicensed band over the transmission of the MAC PDU indicated as new data when a logical channel (LCH) priority associated with the MAC PDU indicated as new data is not higher than an LCH priority associated with the pending MAC PDU; and
the MAC entity prioritizing transmission of the MAC PDU indicated as new data through the first uplink configured grant associated with a second HARQ process ID on the unlicensed band over autonomous transmission of the pending MAC PDU when the LCH priority associated with the MAC PDU indicated as new data is higher than the LCH priority associated with the pending MAC PDU.

19. The method of claim 18, wherein when the transmission of the MAC PDU indicated as new data through the first UL configured grant is prioritized over the autonomous transmission of the pending MAC PDU through the first UL configured grant, the pending MAC PDU is deprioritized by being queued in the HARQ buffer.

20. The method of claim 18, wherein when the transmission of the MAC PDU indicated as new data through the first UL configured grant is prioritized over the autonomous transmission of the pending MAC PDU through the first UL configured grant, the pending MAC PDU is dropped.

21. The method of claim 18, wherein the MAC entity determines a cause of pending the pending MAC PDU in the HARQ buffer of the HARQ process.

22. The method of claim 21, wherein when determining the cause of pending the pending MAC PDU in the HARQ buffer of the HARQ process is listen before talk (LBT) failure, the MAC entity performs the autonomous transmission of the pending MAC PDU according to a configured grant retransmission timer.

23. The method of claim 22, wherein the configured grant retransmission timer comprises a parameter cg-RetransmissionTimer.

24. The method of claim 21, wherein when determining the cause of pending the pending MAC PDU in the HARQ buffer of the HARQ process is that the pending MAC PDU has been deprioritized, the MAC entity performs the autonomous transmission of the pending MAC PDU according to an autonomous transmission indicator, and the autonomous transmission indicator comprises a parameter autonomousTX.

25. The method of claim 24, wherein the MAC entity stops the cg-RetransmissionTimer for the HARQ process of an uplink configured grant that has been deprioritized, wherein the uplink configured grant that has been deprioritized is the first UL configured grant.

26. The method of claim 18, wherein the MAC entity determines whether an LBT failure indication is sent from a lower layer of the MAC entity of the UE.

27. The method of claim 26, wherein the MAC entity performs the determining as to whether an LBT failure indication is sent from the lower layer of the MAC entity of the UE before the determining as to whether a MAC PDU is buffered in the HARQ buffer of the HARQ process as the pending MAC PDU; or the MAC entity performs the determining as to whether an LBT failure indication is sent from the lower layer of the MAC entity of the UE after the determining as to whether a MAC PDU is buffered in the HARQ buffer of the HARQ process as the pending MAC PDU.

28. The method of claim 18, wherein the MAC entity performs the detecting of the collision before the determining as to whether a MAC PDU is buffered in the HARQ buffer of the HARQ process as the pending MAC PDU; or
   the MAC entity performs the detecting of the collision after the determining as to whether a MAC PDU is buffered in the HARQ buffer of the HARQ process as the pending MAC PDU.

29. The method of claim 18, wherein the MAC entity performs the LCH-based prioritization before the determining as to whether a MAC PDU is buffered in the HARQ buffer of the HARQ process as the pending MAC PDU; or
   the MAC entity performs the LCH-based prioritization after the determining as to whether a MAC PDU is buffered in the HARQ buffer of the HARQ process as the pending MAC PDU.

30. The method of claim 18, wherein the MAC entity performs determining as to whether a cause of pending the pending MAC PDU in the HARQ buffer of the HARQ process is listen before talk (LBT) failure before determining as to whether the cause of pending the pending MAC PDU in the HARQ buffer of the HARQ process is that the pending MAC PDU has been deprioritized.

31. The method of claim 18, wherein the MAC entity performs the autonomous transmission of the pending MAC PDU using a HARQ process identifier (HID) of the HARQ process, and the HID of the HARQ process is shared by different uplink configured grants.

32. A user equipment (UE) comprising:
   a processor configured to call and run a computer program stored in a memory, to cause a device in which the processor is installed to execute a method of claim 18.

33. A chip, comprising:
   a processor, configured to call and run a computer program stored in a memory, to cause a device in which the chip is installed to execute a method of claim 18.

34. A non-transitory computer-readable storage medium, in which a computer program is stored, wherein the computer program causes a computer to execute a method of claim 18.

* * * * *